United States Patent
Ni et al.

(10) Patent No.: US 9,461,894 B2
(45) Date of Patent: Oct. 4, 2016

(54) PACKET PROCESSING METHOD, DEEP PACKET INSPECTION REQUEST NETWORK ELEMENT AND DEEP PACKET INSPECTION DEVICE

(71) Applicant: Huawei Technologies Co., Ltd., Shenzhen (CN)

(72) Inventors: Hui Ni, Shenzhen (CN); Shiyong Tan, Shenzhen (CN); Hui Cai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 14/615,362

(22) Filed: Feb. 5, 2015

(65) Prior Publication Data

US 2015/0156083 A1 Jun. 4, 2015

Related U.S. Application Data

(63) Continuation of application No. PCT/CN2012/080504, filed on Aug. 23, 2012.

(51) Int. Cl.
*H04L 12/26* (2006.01)
*H04L 12/801* (2013.01)
(Continued)

(52) U.S. Cl.
CPC .............. *H04L 43/028* (2013.01); *H04L 45/00* (2013.01); *H04L 47/10* (2013.01); *H04L 47/35* (2013.01);
(Continued)

(58) Field of Classification Search
CPC ....... H04L 12/26; H04L 12/56; H04L 12/66; H04L 12/70; H04L 12/701; H04L 12/801; H04L 12/5689; H04L 29/06; H04L 29/08; H04L 41/5009; H04L 43/028; H04L 43/062; H04L 45/00; H04L 45/38; H04L 47/10; H04L 47/18; H04L 47/20; H04L 47/22; H04L 47/24; H04L 47/35; H04L 47/70; H04L 47/125; H04L 63/0227; H04L 63/0245; H04L 63/20; H04L 63/1416; H04L 69/22; H04L 69/32; H04L 69/161; H04L 69/326–69/329; H04W 24/00; H04W 24/08; H04W 28/00; H04W 28/02; H04W 28/0289; H04W 28/10
See application file for complete search history.

(56) References Cited

U.S. PATENT DOCUMENTS 6,163,843 A 12/2000 Inoue et al.
8,126,428 B2 * 2/2012 Gelbman ............... H04L 12/14
455/406

(Continued)

FOREIGN PATENT DOCUMENTS

CN 101399749 A 4/2009
CN 101459489 A 6/2009
(Continued)

*Primary Examiner* — Tri H Phan
(74) *Attorney, Agent, or Firm* — Leydig, Voit & Mayer, Ltd.

(57) ABSTRACT

Embodiments of the present disclosure provide a packet processing method, a DPI network element and a DPI device. The method includes: determining, according to a packet feature of a first packet of a service flow, that a first deep packet inspection DPI device is used for performing DPI on the first packet, where DPI needs to be performed on the first packet; sending a first DPI request to the first DPI device, wherein the first DPI request includes all or part of contents of the first packet; and receiving a first DPI response that is sent by the first DPI device according to the first DPI request, wherein the first DPI response includes DPI result. The packet processing method, the DPI network element and the DPI device of the embodiments of the present disclosure can realize support for a network environment deployed with multiple DPI devices.

20 Claims, 13 Drawing Sheets

(51) Int. Cl.
  *H04L 12/701*   (2013.01)
  *H04L 29/06*    (2006.01)
  *H04L 29/08*    (2006.01)

(52) U.S. Cl.
  CPC ....... *H04L 63/0245* (2013.01); *H04L 63/1416* (2013.01); *H04L 63/20* (2013.01); *H04L 69/161* (2013.01); *H04L 69/22* (2013.01); *H04L 69/32* (2013.01)

(56) References Cited

U.S. PATENT DOCUMENTS

| | | | | |
|---|---|---|---|---|
| 8,179,846 | B2* | 5/2012 | Dolganow | H04W 76/068 370/329 |
| 8,266,673 | B2* | 9/2012 | Hu | H04L 63/0227 726/1 |
| 9,295,065 | B2* | 3/2016 | Dahod | H04N 21/6131 |
| 2009/0238192 | A1 | 9/2009 | Dolganow et al. | |
| 2009/0262741 | A1 | 10/2009 | Jungck et al. | |
| 2010/0062781 | A1* | 3/2010 | Dolganow | H04W 76/068 455/450 |
| 2010/0132031 | A1 | 5/2010 | Zheng | |
| 2010/0260048 | A1 | 10/2010 | Dolganow et al. | |
| 2012/0304250 | A1* | 11/2012 | Hu | H04L 63/0227 726/1 |

FOREIGN PATENT DOCUMENTS

| | | |
|---|---|---|
| CN | 101534248 A | 9/2009 |
| CN | 101605018 A | 12/2009 |

* cited by examiner

PACKET PROCESSING METHOD, DEEP PACKET INSPECTION REQUEST NETWORK ELEMENT AND DEEP PACKET INSPECTION DEVICE

CROSS-REFERENCE TO RELATED APPLICATIONS

This application is a continuation of International Patent Application No. PCT/CN2012/080504, filed on Aug. 23, 2012, which is hereby incorporated by reference in its entirety.

TECHNICAL FIELD

The present disclosure relates to communications, and more particularly, to a packet processing method, a deep packet inspection request network element and a deep packet inspection device.

BACKGROUND

With emergence of a network broadband technology, opportunities are brought to telecommunication operators, and meanwhile, a lot of problems to be solved are generated. At present, in a bearer network of a telecommunication operator, various new applications are carried in an upper layer network of a transmission control protocol/internet protocol (Transmission Control Protocol/Internet Protocol, referred to as "TCP/IP") for transmission. However, the operator cannot directly perceive these applications, thus resulting in gradual channelization of an operator network, which leads to problems that services are difficult to manage, content charging cannot be realized, information security requirements cannot be satisfied and the like. In order to solve these problems, a deep packet inspection (Deep Packet Inspection, referred to as "DPI") technology is introduced into a telecommunication network to improve perception capability of the network to packet application information. DPI is a basis for realizing service management based on an application in current operator network, and various kinds of DPI devices are deployed in a large scale in the operator network.

Due to the lack of standardization, existing DPI devices are all customized devices deployed by respective manufacturers according to demands of operators. In a scenario where an external DPI is adopted, a DPI request network element is generally configured with information of a particular DPI device providing DPI service for the DPI request network element.

Current DPI request network element only supports a single DPI device, and cannot support multiple DPI devices.

Therefore, a problem of how to perform DPI in a network environment deployed with multiple DPI devices is to be solved urgently.

SUMMARY

Embodiments of the present disclosure provide a packet processing method, a deep packet inspection request network element and a deep packet inspection device, which can realize supporting for a network environment deployed with multiple DPI devices.

In a first aspect, a packet processing method is provided, and the method includes: determining, according to a packet feature of a first packet of a service flow, that a first deep packet inspection (DPI) device is used for performing DPI on the first packet, where DPI needs to be performed on the first packet; sending a first DPI request to the first DPI device, where the first DPI request includes all or part of contents of the first packet; and receiving a first DPI response that is sent by the first DPI device according to the first DPI request, where the first DPI response includes DPI result.

In combination with the first aspect, in a first possible implementation manner of the first aspect, when it is determined that a DPI context identifier corresponding to the service flow is stored, the sending a first DPI request to the first DPI device, includes:

sending the first DPI request which further includes the DPI context identifier corresponding to the service flow to the first DPI device, so as to enable the first DPI device to determine DPI context corresponding to the service flow according to the DPI context identifier corresponding to the service flow, and to perform DPI on all or part of contents of the first packet according to the DPI context corresponding to the service flow.

In combination with the first aspect, in a second possible implementation manner of the first aspect, the method further includes:

when the first DPI response includes a DPI context identifier corresponding to the service flow, acquiring the DPI context identifier corresponding to the service flow from the first response, and carrying the DPI context identifier corresponding to the service flow in a DPI request when the DPI request comprising a packet of the service flow is subsequently sent to the first DPI device, where DPI needs to be performed on the packet.

In combination with any one of the first aspect, and the first and the second possible implementation manners of the first aspect, in a third possible implementation manner of the first aspect, the first DPI response further includes instruction information for instructing whether the DPI request network element continues to report a packet of the service flow to the first DPI device, where DPI needs to be performed on the packet, so as to enable the DPI request network element to determine whether it needs to continue to send a DPI request carrying a packet of the service flow to the first DPI device subsequently according to the instruction information.

In combination with any one of the first aspect, and the first to the third possible implementation manners of the first aspect, in a fourth possible implementation manner of the first aspect, before the determining that a first DPI device is used for performing DPI on the first packet, the method further includes:

receiving a DPI allocation message sent by a second DPI device, where the DPI allocation message includes a correspondence of a packet feature and a DPI device.

In combination with any one of the first aspect, and the first to the third possible implementation manners of the first aspect, in a fifth possible implementation manner of the first aspect, before the determining that a first DPI device is used for performing DPI on the first packet, the method further includes:

sending a DPI allocation request message to a third DPI device, where the DPI allocation request message carries all or part of contents of the first packet, or carries the packet feature of the first packet; and receiving a DPI allocation response message sent by the third DPI device, where the DPI allocation response message carriers a device identifier of the first DPI device, and is used for notifying the DPI request network element that the first DPI device performs DPI on a packet on which DPI needs to be performed and which corresponds to the packet feature of the first packet.

In combination with any one of the first aspect, and the first to the third possible implementation manners of the first aspect, in a sixth possible implementation manner of the first aspect, before the determining that a first DPI device is used for performing DPI on the first packet, the method further includes:

determining, according to the packet feature of the first packet, that a fourth DPI device is used for performing DPI on the first packet;

sending a second DPI request to the fourth DPI device, where the second DPI request carries all or part of contents of the first packet; and receiving a DPI redirection message that is sent by the fourth DPI device according to the second DPI request, where the DPI redirection message carries a device identifier of the first DPI device, and is used for notifying the DPI request network element that the first DPI device performs DPI on a packet on which DPI needs to be performed and which corresponds to the packet feature of the first packet.

In combination with any one of the first aspect, and the first to the sixth possible implementation manners of the first aspect, in a seventh possible implementation manner of the first aspect, the method further includes:

receiving a DPI switch notification message sent by the first DPI device, where the DPI switch notification message carries a device identifier of a fifth DPI device, and is used for notifying the DPI request network element that the fifth DPI device performs DPI on a packet of the service flow, where DPI needs to be performed on the packet subsequently.

In combination with the seventh possible implementation manner of the first aspect, in an eighth possible implementation manner of the first aspect, the DPI switch notification message further carries an updated DPI context identifier corresponding to the service flow.

In combination with any one of the first aspect, and the first to the eighth possible implementation manners of the first aspect, in a ninth possible implementation manner of the first aspect, the packet feature includes at least one of a protocol type, an affiliated APN network, a service type, user information and user group information.

In a second aspect, a packet processing method is provided, and the method includes: receiving a first deep packet inspection (DPI) request, which is sent by a DPI device according to packet feature of a first packet of a service flow, where DPI needs to be performed on the packet, and the first DPI request includes all or part of contents of the first packet; performing DPI on all or part of contents of the first packet according to the first DPI request to acquire DPI result; and sending a first DPI response to the DPI request network element, where the first DPI response includes the DPI result.

In combination with the second aspect, in a first possible implementation manner of the second aspect, the performing DPI on all or part of contents of the first packet according to the first DPI request, includes:

determining, according to the first DPI request, whether DPI context corresponding to the service flow has been established;

when it is determined that the DPI context corresponding to the service flow has been established, performing DPI on all or part of contents of the first packet according to the DPI context corresponding to the service flow; and when it is determined that the DPI context corresponding to the service flow has not been established, performing DPI on all or part of contents of the first packet and establishing the DPI context corresponding to the service flow.

In combination with the first possible implementation manner of the second aspect, in a second possible implementation manner of the second aspect, the first DPI request includes a DPI context identifier corresponding to the service flow; and when it is determined that the DPI context corresponding to the service flow has been established, the performing DPI on all or part of contents of the first packet according to the DPI context corresponding to the service flow, includes:

acquiring the DPI context corresponding to the service flow according to the DPI context identifier corresponding to the service flow comprised in the first DPI request; and performing DPI on all or part of contents of the first packet according to the DPI context corresponding to the service flow.

In combination with the first possible implementation manner of the second aspect, in a third possible implementation manner of the second aspect, when it is determined that the DPI context corresponding to the service flow has not been established, the performing DPI on all or part of contents of the first packet and establishing the DPI context corresponding to the service flow, includes:

performing DPI on all or part of contents of the first packet, establishing DPI context corresponding to the service flow, and generating a DPI context identifier corresponding to the service flow; and the sending a first DPI response to the DPI request network element, includes:

sending the first DPI response comprising the DPI context identifier corresponding to the service flow to the DPI request network element.

In combination with any one of the second aspect, and the first to the third possible implementation manners of the second aspect, in a fourth possible implementation manner of the second aspect, the performing DPI on all or part of contents of the first packet, includes:

determining whether the DPI request network element needs to continue to report a subsequent packet of the service flow; and where the first DPI response further includes instruction information for instructing whether the DPI request network element continues to report the subsequent packet of the service flow to the first DPI device, so as to enable the DPI request network element to determine whether it needs to continue to send a DPI request carrying a packet of the service flow to the first DPI device subsequently according to the instruction information.

In combination with any one of the second aspect, and the first to the fourth possible implementation manners of the second aspect, in a fifth possible implementation manner of the second aspect, the method further includes:

determining to switch DPI function for a packet of the service flow to a fifth DPI device, where DPI needs to be performed on the packet;

sending a DPI switch request message to the fifth DPI device, where the DPI switch request message carries DPI context corresponding to the service flow;

receiving a DPI switch request response sent by the fifth DPI device according to the DPI switch request message; and sending a DPI switch notification message to the DPI request network element, where the DPI switch notification message carriers a device identifier of the fifth DPI device, and is used for notifying the DPI request network element that the fifth DPI device is used for performing DPI on a packet of the service flow, where DPI needs to be performed on the packet.

In combination with the fifth possible implementation manner of the second aspect, in a sixth possible implementation manner of the second aspect, the DPI switch notification message and the DPI switch notification message carry an updated DPI context identifier corresponding to the service flow.

In a third aspect, a DPI request network element is provided, which includes: a first determining unit, configured to determine, according to a packet feature of a first packet of a service flow, that a first deep packet inspection (DPI) device is used for performing DPI on the first packet, where DPI needs to be performed on the first packet; a first sending unit, configured to send a first DPI request to the first DPI device, where the first DPI request includes all or part of contents of the first packet; and a first receiving unit, configured to receive a first DPI response that is sent by the first DPI device according to the first DPI request, where the first DPI response includes DPI result.

In combination with the third aspect, in a first possible implementation manner of the third aspect, when it is determined that a DPI context identifier corresponding to the service flow is stored, the first sending unit is specifically configured to:

send the first DPI request which further includes the DPI context identifier corresponding to the service flow to the first DPI device, so as to enable the first DPI device to determine DPI context corresponding to the service flow according to the DPI context identifier corresponding to the service flow, and to perform DPI on all or part of contents of the first packet according to the DPI context corresponding to the service flow.

In combination with the third aspect, in a second possible implementation manner of the third aspect, the DPI request network element further includes:

an acquiring unit, configured to acquire, when the first DPI response includes a DPI context identifier corresponding to the service flow, the DPI context identifier corresponding to the service flow from the first response, and to carry the DPI context identifier corresponding to the service flow in a DPI request when the DPI request comprising a packet of the service flow is subsequently sent to the first DPI device, where DPI needs to be performed on the packet.

In combination with any one of the third aspect, and the first and the second possible implementation manners of the third aspect, in a third possible implementation manner of the third aspect, the first DPI response further includes instruction information for instructing whether the DPI request network element continues to report a packet of the service flow to the first DPI device, where DPI needs to be performed on the packet, so as to enable the DPI request network element to determine whether it needs to continue to send a DPI request carrying a packet of the service flow to the first DPI device subsequently according to the instruction information.

In combination with any one of the third aspect, and the first to the third possible implementation manners of the third aspect, in a fourth possible implementation manner of the third aspect, the DPI request network element further includes:

a second receiving unit, configured to receive a DPI allocation message sent by a second DPI device before it is determined that the first DPI device is used for performing DPI on the first packet, where the DPI allocation message includes a correspondence of a packet feature and a DPI device.

In combination with any one of the third aspect, and the first to the third possible implementation manners of the third aspect, in a fifth possible implementation manner of the third aspect, the DPI request network element further includes:

a second sending unit, configured to send a DPI allocation request message to a third DPI device before it is determined that the first DPI device is used for performing DPI on the first packet, where the DPI allocation request message carries all or part of contents of the first packet, or carries the packet feature of the first packet; and a third receiving unit, configured to receive a DPI allocation response message sent by the third DPI device, where the DPI allocation response message carriers a device identifier of the first DPI device, and is used for notifying the DPI request network element that the first DPI device performs DPI on a packet on which DPI needs to be performed and which corresponds to the packet feature of the first packet.

In combination with any one of the third aspect, and the first to the third possible implementation manners of the third aspect, in a sixth possible implementation manner of the third aspect, the DPI request network element further includes:

a second determining unit, configured to determine, before it is determined that the first DPI device is used for performing DPI on the first packet, that a fourth DPI device is used for performing DPI on the first packet according to the packet feature of the first packet;

a third sending unit, configured to a second DPI request to the fourth DPI device, where the second DPI request carries all or part of contents of the first packet; and a fourth receiving unit, configured to receive a DPI redirection message that is sent by the fourth DPI device according to the second DPI request, where the DPI redirection message carries a device identifier of the first DPI device, and is used for notifying the DPI request network element that the first DPI device performs DPI on a packet on which DPI needs to be performed and which corresponds to the packet feature of the first packet.

In combination with any one of the third aspect, and the first to the sixth possible implementation manners of the third aspect, in a seventh possible implementation manner of the third aspect, the DPI request network element further includes:

a fifth receiving unit, configured to receive a DPI switch notification message sent by the first DPI device, where the DPI switch notification message carries a device identifier of a fifth DPI device, and is used for notifying the DPI request network element that the fifth DPI device performs DPI on a packet of the service flow, where DPI needs to be performed on the packet subsequently.

In combination with the seventh possible implementation manner of the third aspect, in an eighth possible implementation manner of the third aspect, the DPI switch notification message further carries an updated DPI context identifier corresponding to the service flow.

In combination with any one of the third aspect, and the first to eighth possible implementation manners of the third aspect, in a ninth possible implementation manner of the third aspect, the packet feature includes at least one of a protocol type, an affiliated APN network, a service type, user information and user group information.

In a fourth aspect, a DPI device is provided, which includes: a first receiving unit, configured to receive a first deep packet inspection (DPI) request, which is sent by a DPI device according to packet feature of a first packet of a service flow, where DPI needs to be performed on the packet, and the first DPI request includes all or part of contents of the first packet; a DPI performing unit, configured to perform DPI on all or part of contents of the first packet according to the first DPI request to acquire DPI result; and a first sending unit, configured to send a first DPI response to the DPI request network element, where the first DPI response includes the DPI result.

In combination with the fourth aspect, in a first possible implementation manner of the fourth aspect, the DPI performing unit is specifically configured to:

determine, according to the first DPI request, whether DPI context corresponding to the service flow has been established;

when it is determined that the DPI context corresponding to the service flow has been established, perform DPI on all or part of contents of the first packet according to the DPI context corresponding to the service flow; and when it is determined that the DPI context corresponding to the service flow has not been established, perform DPI on all or part of contents of the first packet and establishing the DPI context corresponding to the service flow.

In combination with the first possible implementation manner of the fourth aspect, in a second possible implementation manner of the fourth aspect, the first DPI request includes a DPI context identifier corresponding to the service flow; and when it is determined that the DPI context corresponding to the service flow has been established, the DPI performing unit is specifically configured to:

acquire the DPI context corresponding to the service flow according to the DPI context identifier corresponding to the service flow comprised in the first DPI request; and perform DPI on all or part of contents of the first packet according to the DPI context corresponding to the service flow.

In combination with the first possible implementation manner of the fourth aspect, in a third possible implementation manner of the fourth aspect, when it is determined that the DPI context corresponding to the service flow has not been established, the DPI performing unit is specifically configured to:

perform DPI on all or part of contents of the first packet, establishing DPI context corresponding to the service flow, and generating a DPI context identifier corresponding to the service flow; and the first sending unit is specifically configured to:

send the first DPI response comprising the DPI context identifier corresponding to the service flow to the DPI request network element.

In combination with any one of the fourth aspect, and the first to the third possible implementation manners of the fourth aspect, in a fourth possible implementation manner of the fourth aspect, the DPI performing unit is specifically configured to:

determine whether the DPI request network element needs to continue to report a subsequent packet of the service flow; and where the first DPI response further includes instruction information for instructing whether the DPI request network element continues to report the subsequent packet of the service flow to the first DPI device, so as to enable the DPI request network element to determine whether it needs to continue to send a DPI request carrying a packet of the service flow to the first DPI device subsequently according to the instruction information.

In combination with any one of the fourth aspect, and the first to the fourth possible implementation manners of the fourth aspect, in a fifth possible implementation manner of the fourth aspect, the device further includes:

a second determining unit, configured to determine to switch DPI function for a packet of the service flow to a fifth DPI device, where DPI needs to be performed on the packet subsequently;

a second sending unit, configured to send a DPI switch request message to the fifth DPI device, where the DPI switch request message carries DPI context corresponding to the service flow;

a second receiving unit, configured to receive a DPI switch request response sent by the fifth DPI device according to the DPI switch request message; and a third sending unit, configured to send a DPI switch notification message to the DPI request network element, where the DPI switch notification message carriers a device identifier of the fifth DPI device, and is used for notifying the DPI request network element that the fifth DPI device is used for performing DPI on a packet of the service flow, where DPI needs to be performed on the packet.

In combination with the fifth possible implementation manner of the fourth aspect, in a sixth possible implementation manner of the fourth aspect, the DPI switch notification message and the DPI switch notification message carry an updated DPI context identifier corresponding to the service flow.

Based on the above-mentioned technical solutions, according to the packet processing method, the DPI request network element and the DPI device provided by the embodiments of the present disclosure, a DPI device, which is used for performing DPI on a packet on which DPI needs to be performed, is determined based on the packet feature of the packet on which DPI needs to be performed, thus realize supporting for a network environment deployed with multiple DPI devices.

BRIEF DESCRIPTION OF DRAWINGS

To illustrate technical solutions in the embodiments of the present disclosure more clearly, a brief introduction on the accompanying drawings which are needed in the description of the embodiments or the prior art is given below. Apparently, the accompanying drawings in the description below are merely some of the embodiments of the present disclosure, based on which other drawings may be obtained by those of ordinary skill in the art without any creative effort.

DETAILED DESCRIPTION OF EMBODIMENTS

The technical solutions in the embodiments of the present disclosure will be described clearly and fully below, in combination with the accompanying drawings in the embodiments of the present disclosure. Apparently, the embodiments described are merely a part, but not all, of the embodiments of the present disclosure. All of other embodiments, obtained by those of ordinary skill in the art based on the embodiments of the present disclosure without any creative effort, fall into the protection scope of the present disclosure.

It should be appreciated that the technical solutions of the present disclosure may be applied to various communication systems, such as, for example, a global system of mobile communication (Global System of Mobile communication, referred to as "GSM"), a code division multiple access (Code Division Multiple Access, referred to as "CDMA") system, a wideband code division multiple access (Wideband Code Division Multiple Access, referred to as "WCDMA") system, a general packet radio service (General Packet Radio Service, referred to as the "GPRS"), a long term evolution (Long Term Evolution, referred to as "LTE") system, an LTE frequency division duplex (Frequency Division Duplex, referred to as "FDD") system, an LTE time division duplex (Time Division Duplex, referred to as "TDD"), a universal mobile telecommunication system (Universal Mobile Telecommunication System, referred to as "UMTS") and the like.

The DPI technology is a technology with regard to common packet analysis. In common packet inspection, only contents beneath an application layer of an IP packet are analyzed. For example, a data packet is categorized and processed according to quintuple information (including a source address, a destination address, a source port, a destination port and a protocol type) of a received IP packet. While in DPI, inspection at a deeper level is performed to a packet, including analyzing the packet at an application layer or inspecting the packet based on traffic feature, identifying an application layer service type corresponding to the packet, and/or extracting application layer key information therein for subsequent service processing. DPI is a relatively wide concept. In some documents, a packet inspection technology based on traffic feature is also referred to as deep flow inspection (DFI, Deep Flow Inspection). In the present disclosure, identification and/or analysis based on information of an IP packet above a TCP/IP layer and DFI are generally referred to as DPI.

Figure 1:
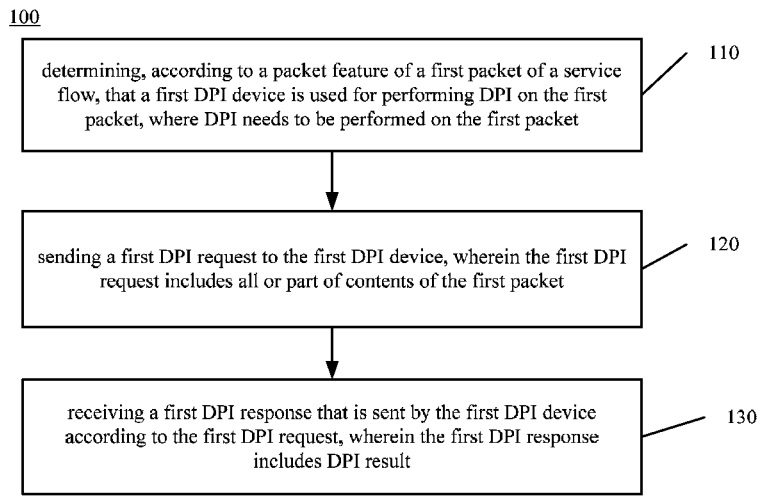
FIG. 1 shows a schematic flowchart of a packet processing method according to an embodiment of the present disclosure.

FIG. 1 depicts a schematic flowchart of a packet processing method 100 according to an embodiment of the present disclosure, where the method 100 may be executed by a DPI request network element. As shown in FIG. 1, the method 100 includes the following steps:

110, determining, according to a packet feature of a first packet of a service flow, that a first DPI device is used for performing DPI on the first packet, where DPI needs to be performed on the first packet;

120, sending a first DPI request to the first DPI device, where the first DPI request includes all or part of contents of the first packet; and

130, receiving a first DPI response that is sent by the first DPI device according to the first DPI request, where the first DPI response includes DPI result.

Specifically, after the DPI request network element determines that it needs to perform DPI on the first packet, the DPI request network element may acquire the packet feature of the first packet, such as, for example, at least one of a protocol type, an affiliated APN network, a service type, user information and user group information of the first packet; and then may determine, according to the packet feature of the first packet, that DPI is performed to the first packet by the first DPI device, and send the first DPI request carrying all or part of contents of the first packet to the first DPI device after it is determined that the first DPI device performs DPI on the first packet. After the first DPI request sent by the DPI request network element is received, the first DPI device may perform DPI on all or part of contents of the first packet carried in the first DPI request to acquire the DPI result, and then send the first DPI response carrying the DPI result to the DPI request network element. After the first DPI response sent by the first DPI device is received, the DPI request network element may perform subsequent operation according to the DPI result in the first DPI response. For example, a service control policy corresponding to the first packet is acquired, and service control is performed to the first packet according to the service control policy.

Therefore, in the packet processing method of the embodiment of the present disclosure, the DPI device, which is used for performing DPI on the packet on which DPI needs to be performed, is determined based on the packet feature of the packet on which DPI needs to be performed, thus realizing support for a network environment deployed with multiple DPI devices.

In the embodiment of the present disclosure, when a DPI context identifier corresponding to the service flow is stored, step 120 sending a first DPI request to the first DPI device, may include the following step:

sending the first DPI request, which further includes the DPI context identifier corresponding to the service flow, to the first DPI device, so as to enable the first DPI device to determine DPI context corresponding to the service flow according to the DPI context identifier corresponding to the service flow, and to perform DPI on all or part of contents of the first packet according to the DPI context corresponding to the service flow.

Specifically, before the first DPI request is sent to the first DPI device, the DPI request network element may determine whether the DPI context identifier corresponding to the service flow is stored by the DPI request network element per se, and when it is determined that the DPI context identifier is stored, the DPI context identifier may be carried in the first DPI request, so as to enable the first DPI device to determine DPI context corresponding to the service flow according to the DPI context identifier corresponding to the service flow, and to perform DPI on all or part of contents of the first packet carried in the first DPI request according to the DPI context corresponding to the service flow.

In the embodiment of the present disclosure, the method 100 may further include the following step:

when the first DPI response includes a DPI context identifier corresponding to the service flow, acquiring the DPI context identifier corresponding to the service flow from the first response, and when a DPI request including a packet of the service flow is subsequently sent to the first DPI device, where DPI needs to be performed on the packet, carrying the DPI context identifier corresponding to the service flow in the DPI request.

Specifically, before DPI is performed to the first packet, the first DPI device may firstly determine whether DPI context of the service flow corresponding to the first packet is stored. For example, whether the DPI context of the service flow corresponding to the first packet is stored is searched for according to IP quintuple of the first packet, and if the DPI context of the service flow corresponding to the first packet is not found, DPI context corresponding to the service flow may be established, and a DPI context identifier corresponding to the DPI context is carried when the first DPI response is sent to the DPI request network element. In this way, when the DPI request network element receives the first response, the DPI request network element acquires the DPI context identifier corresponding to the service flow from the first response, and may store the DPI context identifier corresponding to the service flow. When the DPI request including a packet of the service flow is subsequently sent to the first DPI device, where DPI needs to be performed on the packet, the DPI context identifier corresponding to the service flow is carried in the DPI request, so as to enable the first DPI device to directly determine whether DPI context of the service flow corresponding to the first packet is stored according to the DPI context identifier.

Therefore, in the embodiment of the present disclosure, by means of the DPI context identifier, the DPI device is enabled to acquire the DPI context corresponding to the service flow, thereby ensuring normal proceeding of DPI.

In the embodiment of the present disclosure, the first DPI response may further include instruction information for instructing whether the DPI request network element continues to report a packet of the service flow to the first DPI device, where DPI needs to be performed on the packet, so as to enable the DPI request network element to determine whether it needs to continue to send a DPI request carrying a packet of the service flow to the first DPI device subsequently according to the instruction information.

Specifically, after DPI is performed to the packet of the DPI request network element, where DPI needs to be performed on the packet, the first DPI device may determine whether the DPI request network element needs to continue to report a packet of the service flow subsequently according to acquired DPI request, and carry the instruction information, which is used for instructing whether the DPI request network element needs to continue to report a packet of the service flow to the first DPI device subsequently, in the first DPI response, such that after the first DPI response of the first DPI device which carries the instruction information is received, the DPI request network element may store the instruction information, and subsequently determine whether a DPI request carrying a packet of the service flow is continued to sent to the DPI device according to the instruction information.

In the prior art, after the DPI device receives the DPI request of the DPI request network element, the DPI device acquires a packet keyword of the packet in the DPI request, where DPI needs to be performed on the packet, and sends the packet keyword back to the DPI request network element.

However, the above-mentioned keyword which is sent back is closely associated with a specific DPI analysis protocol, and usually changes due to upgrade of an application layer protocol, resulting in that the interface is directly influenced by respective application layer protocols. For example, if the DPI device is added with DPI capability of a new application type, a corresponding interface needs to be defined, leading to definition of an interface is complicated and is quite hard to be stable. Moreover, since the DPI request network element is responsible for determining a service type according to a keyword, once DPI support for an application protocol is added or modified, the DPI request network element needs to modify corresponding application layer keyword matching logic, which makes realization of the DPI request network element to be complicated. At present, a forwarding plane network element tends to become simple and standardized, thus adopting a DPI analysis interface associated with an application is unbeneficial to achieve abstraction and simplification of service control function of the forwarding plane network element.

Therefore, in the embodiment of the present disclosure, step 130, receiving a first DPI response that is sent by the first DPI device according to the first DPI request, may include the following step:

receiving the first DPI response sent by the first DPI device according to the first DPI request, where the first DPI response includes an application identifier corresponding to the first packet.

That is, after the first DPI device receives the first DPI request sent by the DPI request network element, the first DPI device may acquire a packet keyword of the packet on which DPI needs to be performed according to the packet in the first DPI request, where DPI needs to be performed on the packet, map the packet keyword to a corresponding application identifier and directly transmit the application identifier to the DPI request network element, so that the DPI request network element may directly acquire a service control policy according to the application identifier without matching the keyword with a packet protocol, and perform service control according to the service control policy, thereby simplifying realization of the DPI request network element.

In the embodiment of the present disclosure, an application identifier is an identifier defined by an operator or a service provider regarding different application services, For example, 0x0001 is taken as an application identifier of a video service, 0x0002 is taken as an application identifier of a file download service of a particular website, etc. By defining the application identifier, service key feature information is encapsulated. In this way, the DPI device only needs to send the application identifier to the DPI request network element without transferring various kinds of specific key feature information at an interface. The DPI request network element only needs to perform corresponding policy control regarding an abstract application identifier without understanding specific key feature information, thus realizing simplification of a DPI analysis interface and the DPI request network element.

In the embodiment of the present disclosure, before step S110, determining that a first DPI device is used for performing DPI on the first packet, the method further includes the following step:

receiving a DPI allocation message sent by a second DPI device, where the DPI allocation message includes a correspondence of a packet feature and a DPI device.

Specifically, the second DPI device, such as, for example, a DPI management network element, may send the DPI allocation message including the correspondence of a packet feature and a DPI device to the DPI request network element. After the DPI allocation message sent by the second DPI device is received, the DPI request network element may store the correspondence of a packet feature and a DPI device carried in the allocation message, so that when it needs to perform DPI on a packet by a DPI device subsequently, according to a packet feature of the packet on which DPI needs to be performed and the correspondence of a packet feature and a DPI device, a DPI device corresponding to the packet feature of the packet on which DPI needs to be performed may be acquired, and the DPI request including all or part of contents of the packet on which DPI needs to be performed is sent to the DPI device.

Or, in the embodiment of the present disclosure, before step 110 of determining that a first DPI device is used for performing DPI on the first packet, the method further includes the following steps:

sending a DPI allocation request message to a third DPI device, where the DPI allocation request message carries all or part of contents of the first packet, or carries the packet feature of the first packet; and receiving a DPI allocation response message sent by the third DPI device, where the DPI allocation response message carriers a device identifier of the first DPI device, and is used for notifying the DPI request network element that the first DPI device performs DPI on a packet on which DPI needs to be performed and which corresponds to the packet feature of the first packet.

Therefore, according to the packet feature of the first packet, the third DPI device may determine that DPI is to be performed to the first packet by the first DPI device.

Or, in the embodiment of the present disclosure, before step 110 of determining that a first DPI device is used for performing DPI on the first packet, the method further includes the following steps:

determining, according to the packet feature of the first packet, that a fourth DPI device is used for performing DPI on the first packet;

sending a second DPI request to the fourth DPI device, where the second DPI request carries all or part of contents (e.g., a TCP/IP packet header of the packet) of the first packet; and receiving a DPI redirection message that is sent by the fourth DPI device according to the second DPI request, where the DPI redirection message carries a device identifier of the first DPI device, and is used for notifying the DPI request network element that the first DPI device performs DPI on a packet on which DPI needs to be performed and which corresponds to the packet feature of the first packet.

Specifically, according to stored information, such as, for example, a correspondence of a packet feature and a DPI device, the DPI request network element may determine that the fourth DPI device performs DPI on the first packet, and send the second DPI request including all or part of contents of the first packet to the fourth DPI device. The fourth DPI device may not perform DPI on the first packet for a reason such as, for example, load balance or the like, and determine that the first DPI device performs DPI on the first packet and to other packet on which DPI needs to be performed and which corresponds to the packet feature of the first packet; and then, the fourth DPI device may send the DPI redirection message to the DPI request network element, where the DPI redirection message carries the device identifier of the first DPI device, and is used for notifying the DPI request network element that the first DPI device performs DPI on a packet on which DPI needs to be performed and which corresponds to the packet feature of the first packet.

Or, in the embodiment of the present disclosure, the method 100 may further include the following step:

receiving a DPI switch notification message sent by the first DPI device, where the DPI switch notification message carries a device identifier of a fifth DPI device, and is used for notifying the DPI request network element that the fifth DPI device performs DPI on a subsequent packet of the service flow, where DPI needs to be performed on the packet.

Specifically, due to a reason such as load balance, device maintenance or the like, the first DPI device needs to switch DPI function for a subsequent packet of the service flow to which the first packet belongs to the fifth DPI device, and may firstly send a DPI switch request to the fifth DPI device. After the fifth DPI device receives the DPI switch request of the first DPI device, where the switch request may include DPI context of the service flow to which the first packet belongs. After the DPI switch request of the first DPI device is received, the fifth DPI device may store the DPI context in the DPI switch request message and send a switch request response back to the first DPI device, where the switch request response may include a DPI context identifier reallocated to the DPI context. After the switch response message sent by the first DPI device is received, the first DPI device may send a DPI switch notification message to the DPI request network element, where the DPI switch notification message carries the device identifier of the fifth DPI device, and is used for notifying the DPI request network element that the fifth DPI device performs DPI on a subsequent packet of the service flow. Optionally, the DPI switch notification message may further include a DPI context identifier reallocated to the service flow by the fifth DPI. Therefore, after the switch notification message of the DPI request network element is received, if the DPI device needs to perform DPI on a packet corresponding to the service flow subsequently, the DPI request network element may send a DPI request to the fifth DPI device, and optionally, the DPI request may further include the DPI context identifier corresponding to the service flow.

Therefore, in the packet processing method of the embodiment of the present disclosure, a DPI device for performing DPI on a packet on which DPI needs to be performed is determined based on packet feature of the packet on which DPI needs to be performed, thereby realizing support for a network environment deployed with multiple DPI devices. Moreover, by means of the DPI context identifier, validity of the DPI context may be maintained when the DPI device is switched, thereby avoiding interruption of DPI service.

The packet processing method according to the embodiment of the present disclosure has been described above from a DPI request network element side, and the packet processing method according to the embodiment of the present disclosure will be described below from a DPI device side in combination with FIG. 2.

Figure 2:
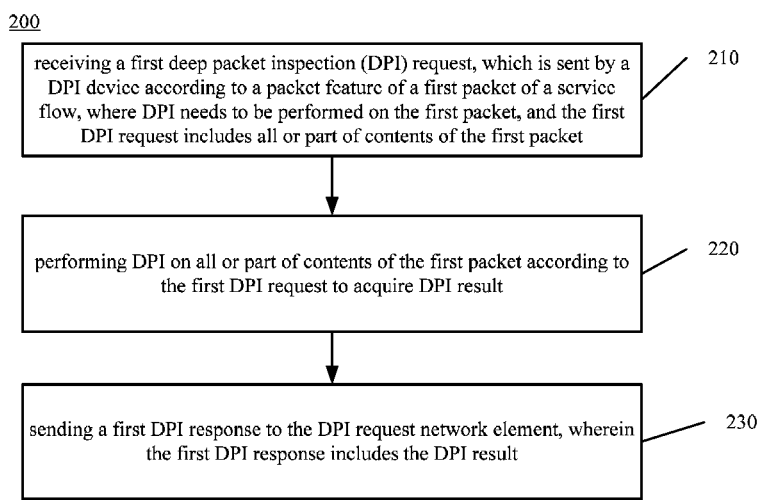
FIG. 2 shows a schematic flowchart of a packet processing method according to another embodiment of the present disclosure.

FIG. 2 shows a schematic flowchart of a packet processing method 200 according to an embodiment of the present disclosure. As shown in FIG. 2, the method 200 may include the following steps:

210, receiving a first deep packet inspection (DPI) request, which is sent by a DPI device according to a packet feature of a first packet of a service flow, where DPI needs to be performed on the first packet, and the first DPI request includes all or part of contents of the first packet;

220, performing DPI on all or part of contents of the first packet according to the first DPI request to acquire DPI result; and 230, sending a first DPI response to the DPI request network element, where the first DPI response includes the DPI result.

Therefore, in the packet processing method of the embodiment of the present disclosure, the DPI device, which is determined according to the packet feature of the packet on which DPI needs to be performed, performs DPI on the packet on which DPI needs to be performed, thereby realizing support for a network environment deployed with multiple DPI devices.

In the embodiment of the present disclosure, step 220, performing DPI on all or part of contents of the first packet according to the first DPI request, may include the following steps:

determining, according to the first DPI request, whether DPI context corresponding to the service flow has been established;

when it is determined that the DPI context corresponding to the service flow has been established, performing DPI on all or part of contents of the first packet according to the DPI context corresponding to the service flow; and when it is determined that the DPI context corresponding to the service flow has not been established, performing DPI on all or part of contents of the first packet and establishing the DPI context corresponding to the service flow.

In the embodiment of the present disclosure, the first DPI request may include a DPI context identifier corresponding to the service flow; and correspondingly, when it is determined that the DPI context corresponding to the service flow has been established, the performing DPI on all or part of contents of the first packet according to the DPI context corresponding to the service flow, includes:

acquiring the DPI context corresponding to the service flow according to the DPI context identifier corresponding to the service flow included in the first DPI request; and performing DPI on all or part of contents of the first packet according to the DPI context corresponding to the service flow.

In the embodiment of the present disclosure, when it is determined that the DPI context corresponding to the service flow has not been established, the performing DPI on all or part of contents of the first packet and establishing the DPI context corresponding to the service flow, includes:

performing DPI on all or part of contents of the first packet, establishing DPI context corresponding to the service flow, and generating a DPI context identifier corresponding to the service flow; and the sending a first DPI response to the DPI request network element, includes:

sending the first DPI response comprising the DPI context identifier corresponding to the service flow to the DPI request network element.

In the embodiment of the present disclosure, 220 of performing DPI on the first packet, may include:

determining whether the DPI request network element needs to continue to report a subsequent packet of the service flow; and correspondingly, the first DPI response further includes instruction information for instructing whether the DPI request network element continues to report the subsequent packet of the service flow to the first DPI device, so as to enable the DPI request network element to determine whether it needs to continue to send a DPI request carrying a packet of the service flow to the first DPI device subsequently according to the instruction information.

In the embodiment of the present disclosure, 220 of performing DPI on all or part of contents of the first packet, may include:

determining a packet keyword corresponding to all or part of contents of the first packet according to all or part of contents of the first packet; and determining an application identifier corresponding to the first packet according to the packet keyword corresponding to all or part of contents of the first packet, where the DPI result includes the application identifier.

In one implementation manner of the present disclosure, taking a third generation partnership project (Third Generation Partnership Project, referred to as "3GPP") evolved packet system (Evolved Packet System, referred to as "EPS") as an example, a DPI device may acquire an application identifier corresponding to the first packet according to a pre-configured correspondence of a packet keyword and an application identifier as well as to the packet keyword corresponding to all or part of contents of the first packet, and send the application identifier to a forwarding gateway through a DPI response. According to the application identifier, the forwarding gateway may acquire a control policy corresponding to the application identifier from a control gateway configured with a correspondence of an application identifier and a control policy, and perform service control according to the control policy.

In another implementation manner of the present disclosure, the DPI device may also acquire the application identifier corresponding to the first packet from other device. For example, for a 3GPP EPS network, after the DPI device receives a DPI request carrying a first packet from a public data network gateway (Public Data Network Gateway, referred to as "PND-GW") (DPI request network element) and acquires a packet keyword of the first packet, the DPI device may send an application identifier request to a policy and charging rule function (Policy and Charging rule function, referred to as "PCRF"). The PCRF may acquire the application identifier corresponding to the packet keyword according to the packet keyword carried in the application identifier request as well as to a pre-configured correspondence of a packet keyword and an application identifier in the PCRF per se, and send the application identifier to the DPI device. After the PDN-GW receives the application identifier sent by the DPI device, according to the application identifier, the PDN-GW may directly acquire the control policy corresponding to the application identifier from the PCRF and perform service control. Certainly, the PDN-GW per se may also store a correspondence of an application identifier and a control policy and directly acquire the control policy corresponding to the application identifier from itself.

Therefore, in the embodiment of the present disclosure, the DPI device only needs to send the application identifier to the DPI request network element without transmitting various kinds of specific key feature information at an interface. The DPI request network element does not need to understand specific key feature information and only needs to perform corresponding policy control regarding an abstract application identifier, thereby realizing simplification of a DPI analysis interface and the DPI request network element.

In the embodiment of the present disclosure, step 230, sending a first DPI response to the DPI request network element, includes:

sending a first DPI response including the DPI result and the application identifier to the DPI request network element.

In the embodiment of the present disclosure, the method 200 may further include the following steps:

determining to switch DPI function for a subsequent packet of the service flow on which DPI needs to be performed to a fifth DPI device;

sending a DPI switch request message to the fifth DPI device, where the DPI switch request message carries DPI context corresponding to the service flow;

receiving a DPI switch request response sent by the fifth DPI device according to the DPI switch request message; and sending a DPI switch notification message to the DPI request network element, where the DPI switch notification message carriers a device identifier of the fifth DPI device, and is used for notifying the DPI request network element that the fifth DPI device is used for performing DPI on a packet of the service flow, where DPI needs to be performed on the packet.

In the embodiment of the present disclosure, the DPI switch notification message and the DPI switch notification message carry an updated DPI context identifier corresponding to the service flow.

Therefore, in the packet processing method of the embodiment of the present disclosure, a DPI device for performing DPI on a packet on which DPI needs to be performed is determined based on packet feature of the packet on which DPI needs to be performed, thereby realizing support for a network environment deployed with multiple DPI devices. Moreover, by means of the DPI context identifier, validity of the DPI context may be maintained when the DPI device is switched, thereby avoiding interruption of DPI service.

The packet processing method according to the embodiment of the present disclosure has been described above from the DPI request network element side and the DPI device side in combination with FIG. 1 and FIG. 2, respectively. In order to make the present disclosure to be understood more clearly, the packet processing method according to the embodiment of the present disclosure will be described below by means of interactions between the DPI request network element and the DPI device in combination with FIG. 3 to FIG. 10.

Figure 3:
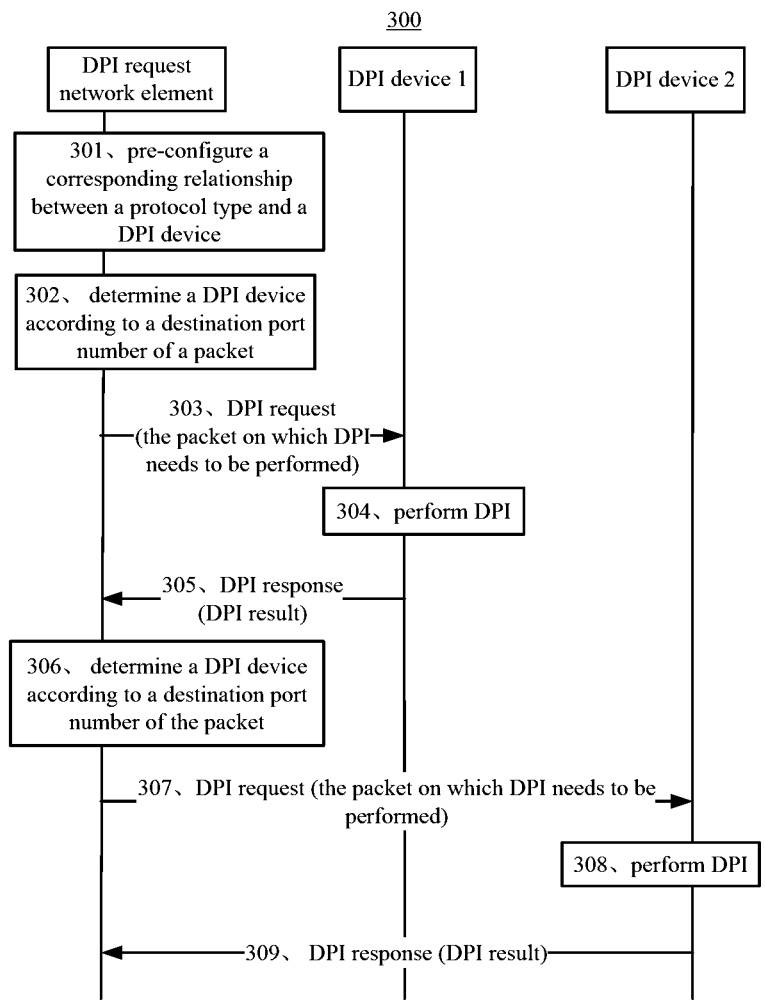
FIG. 3 shows a schematic flowchart of a packet processing method according to another embodiment of the present disclosure.

FIG. 3 is a schematic flowchart of a packet processing method 300 according to an embodiment of the present disclosure. As shown in FIG. 3, the method 300 includes the following steps.

301, correspondence between a protocol type of a packet on which DPI needs to be performed and an IP address of a DPI device is pre-configured on a DPI request network element. For example, a hyper text transfer protocol (Hyper Text Transfer Protocol, referred to as "HTTP") corresponds to an IP address of DPI device 1, and a peer-to-peer (peer-to-peer, referred to as "P2P") protocol corresponds to an IP address of DPI device 2.

302, when the DPI request network element determines that there is a packet on which DPI needs to be performed by a DPI device, the DPI request network element may determine a corresponding DPI device according to a destination port number of the packet on which DPI needs to be performed. If the destination port number is 80, then a protocol type of the packet is determined to be an HPPT protocol, and thus it is determined that DPI device 1 performs DPI on the packet.

303, the DPI request network element sends all or part of contents of the packet to the DPI device 1 through a DPI request, where DPI needs to be performed on the packet.

304, the DPI device 1 performs DPI on all or part of contents of the packet on which DPI needs to be performed. For example, the DPI device 1 performs protocol identification and/or analysis, and optionally, may also search for DPI context corresponding to a service flow to which the packet belongs according to an IP quintuple of the packet on which DPI needs to be performed. If the DPI device 1 is capable of finding out and successfully acquire the DPI context, the DPI device 1 may perform DPI on the packet according to the DPI context corresponding to the service flow to which the packet belongs.

305, the DPI device 1 sends DPI result (e.g., an identification and/or analysis result) back to the DPI request network element through a DPI response message, so as to enable the DPI request network element to perform service control according to the DPI result.

306, the DPI request network element determines that there is a new packet which needs to be processed by a DPI device, determines a protocol type of a service flow to which the packet belongs according a the destination port number of the packet, and determines a DPI device for performing DPI on the packet according to the protocol type of the service flow to which the packet belongs. If the destination port number of the packet is 6881, then the protocol type of the service flow to which the packet belongs is determined to be a P2P protocol, and thus it is determined that DPI device 2 performs DPI on the packet.

Steps 306 to 309 are similar to steps 302-305, and will not be described redundantly herein for concision.

In the embodiment shown in the packet processing method 500, the correspondence between a protocol type and a DPI device is pre-configured on the DPI request network element. It should be understood that the present embodiment is also applicable in a situation that the DPI request network element is pre-configured with a correspondence between other packet feature and a DPI device, where the other packet feature may be one or multiple of an affiliated APN network, a service type, user information and user group information, and certainly, may be other packet feature, which is not limited in the embodiment of the present disclosure. A specific implementation flow is basically the same as the flow of the present embodiment, and will not be described redundantly herein for concision.

Figure 4:
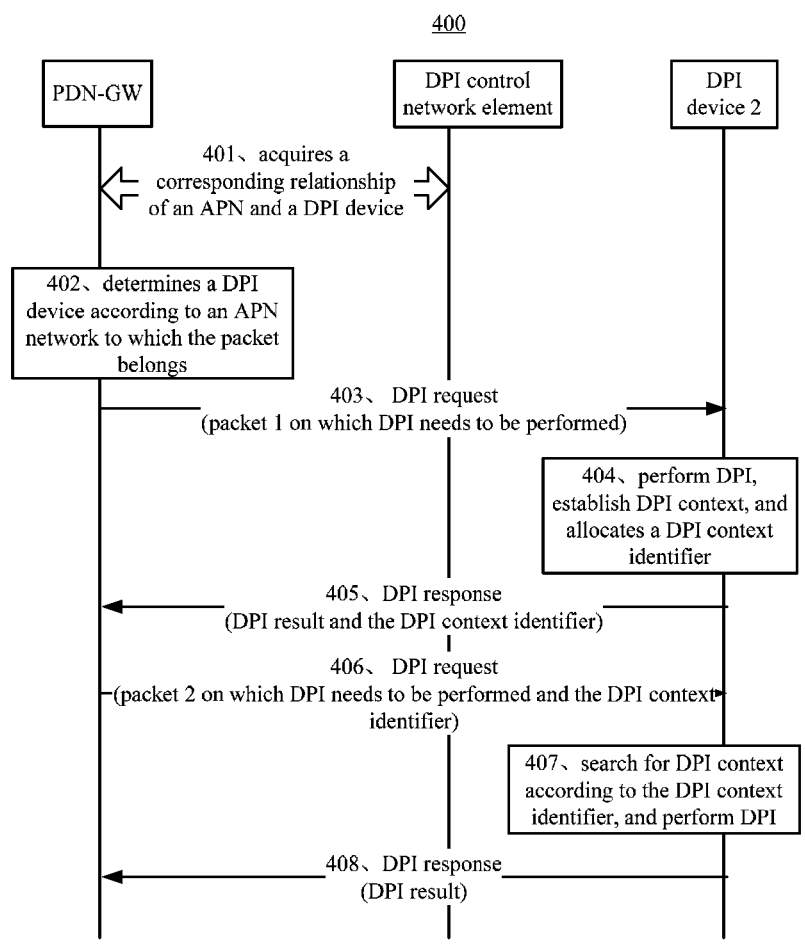
FIG. 4 shows a schematic flowchart of a packet processing method according to another embodiment of the present disclosure.

FIG. 4 is a schematic flowchart of a packet processing method 400 according to an embodiment of the present disclosure. The embodiment is illustrated by taking it as an example that an applied network is a 3GPP EPS and the DPI request network element is a public data network gateway (Public Data Network Gateway, referred to as "PDN-GW"). As shown in FIG. 4, the method 400 includes the following steps.

401, the PDN-GW acquires a correspondence of an APN and a DPI device address from a DPI control network element. For example, a user packet in APN 1 network corresponds to an IP address of DPI device 1, and a user packet in APN 2 network corresponds to an IP address of DPI device 2.

402, the PDN-GW determines a corresponding DPI device according to an APN network, where it needs to perform DPI on packet 1 and the packet 1 belongs to the APN network. For example, the packet 1 is a packet in the APN 2 network, and then it is determined that the DPI device 2 performs DPI on the packet 1.

403, the PDN-GW sends the packet 1 to the DPI device 2 through a DPI request. Since it is the first time the PDN-GW performs DPI on a packet of a service flow to which the packet 1 belongs, the DPI request does not contain a DPI context identifier.

404, the DPI device 2 performs DPI on the packet 1. For example, the DPI device 2 performs protocol identification and/or analysis, establishes DPI context corresponding to the service flow, and allocates a DPI context identifier.

405, the DPI device 2 sends DPI result and the allocated DPI context identifier back to the PDN-GW through a DPI response message, so as to enable the PDN-GW to perform service control according to the DPI result. Optionally, the DPI result may further include continue reporting instruction for instructing that it is still needed to continue to report DPI for a subsequent packet of the service flow.

406, when packet 2, on which DPI needs to be performed and which belongs to a same service flow as the packet, reaches the PDN-GW, the PDN-GW sends the packet 2 to the DPI device 2 through a DPI request, and meanwhile, the request message contains the DPI context identifier sent back by the DPI device 2.

407, the DPI device 2 acquires DPI context corresponding to the service flow according to the DPI context identifier in the request message, and performs DPI on the packet 2 based on the DPI context.

408, the DPI device 2 sends DPI result, for example, an identification or analysis result, back to the PDN-GW through a DPI response message.

The embodiment shown in the packet processing method 400 is also applicable to other mobile or fixed network, such as a gateway general packet radio service support node (Gateway General Packet Radio Service Support Node, referred to as "GGSN"), a serving general packet radio service support support node (Serving General Packet Radio Service Support Support Node, referred to as "SGSN"), a serving gateway (Serving Gateway, referred to as "S-GW"), an access point (Access Point, referred to as "AP"), an access controller (Access Controller, referred to as "AC"), a broadband remote access server (Broadband Remote Access Server, referred to as "BRAS"), a packet data serving node (Packet Data Serving Node, referred to as "PDSN"), an Access service network gateway (Service Network Gateway, referred to as "ASN-GW") or the like, and an implementation flow thereof is basically the same as the flow of the present embodiment, which will not be described redundantly herein for concision.

Figure 5:
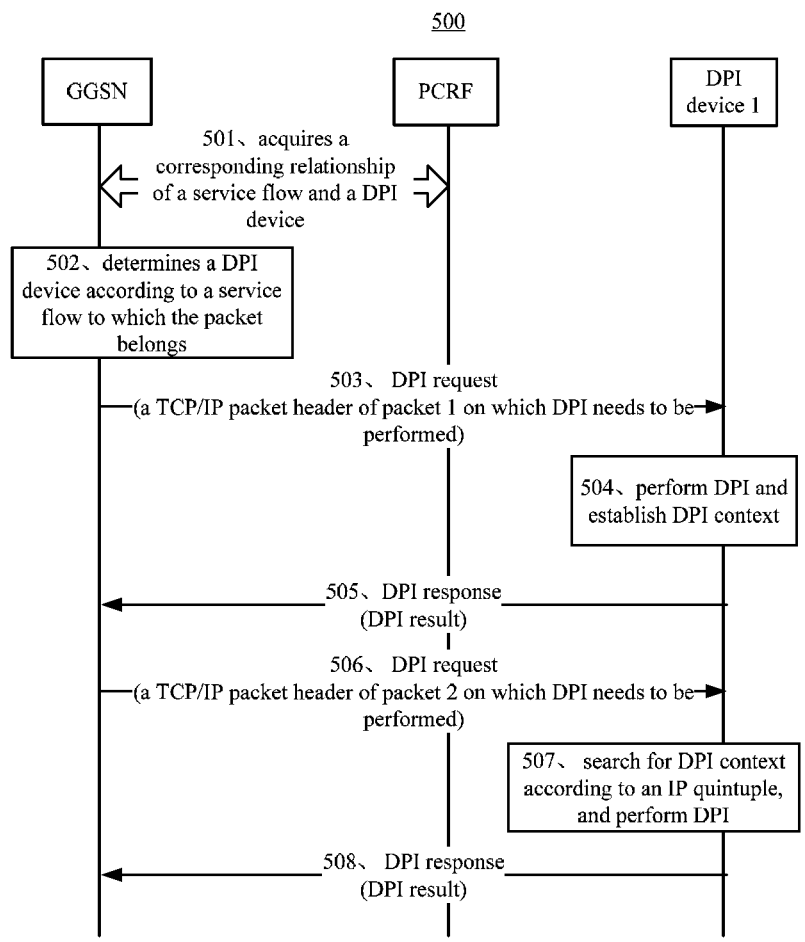
FIG. 5 shows a schematic flowchart of a packet processing method according to another embodiment of the present disclosure.

FIG. 5 is a schematic flowchart of a packet processing method 500 according to an embodiment of the present disclosure. The embodiment is illustrated by taking it as an example that an applied network is a 3GPP universal mobile telecommunication system (Universal Mobile Telecommunication System, referred to as "UMTS") and the DPI request network element is a GGSN. As shown in FIG. 5, the method 500 includes the following steps.

501, the GGSN acquires a correspondence of a service flow and an IP address of a DPI device from a policy and charging rule function (Policy and Charging rule function, referred to as "PCRF"). For example, a user packet of service flow 1 corresponds to an IP address of DPI device 1, and a user packet in service flow 2 corresponds to an IP address of a DPI device 2. Optionally, the acquiring process may be finished by an issuing flow of a PCC policy, and the service flow may be identified by one or by one or multiple groups of IP quintuples.

502, the GGSN determines a corresponding DPI device according to a service flow, where it needs to perform DPI on packet 1 and the packet 1 belongs to the service flow. For example, the service flow to which the packet 1 belongs is service flow 1, and then it is determined that the DPI device 1 performs DPI on the packet 1.

503, the GGSN sends a TCP/IP packet header of the packet 1 to the DPI device 1 through a DPI request.

504, the DPI device 1 performs DPI on the TCP/IP header of the packet 1. For example, the DPI device 1 performs protocol identification and/or analysis, and the DPI device 1 searches for corresponding DPI context according to an IP quintuple of the packet 1. Since it is the first time the DPI device 1 performs DPI on a service flow to which the packet 1 belongs, the DPI context does not exist. After the search fails, the DPI device 1 establishes DPI context corresponding to the service flow, and the DPI context is identified by an IP quintuple.

505, the DPI device 1 sends DPI result back to the GGSN through a DPI response message. Optionally, the DPI result may further include continue reporting instruction for instructing that it is still needed to continue to report DPI for a subsequent packet of the service flow.

506, when packet 2, on which DPI is to be performed and which belongs to a same service flow as the packet, reaches a GGSN, the GGSN sends a TCP/IP packet header of the packet 2 to the DPI device 1 through a DPI request.

507, the DPI device 1 acquires DPI context corresponding to the service flow 1 to which the packet 2 belongs according to an IP quintuple of the packet 2 in the request message, and performs DPI on the packet 2 based on the DPI context and the TCP/IP packet header of the packet 2. For example, the DPI device 1 performs protocol identification and/or analysis.

508, the DPI device 1 sends DPI result, such as, for example, an identification or analysis result, back to the GGSN through a DPI response message, so as to enable the GGSN to perform service control according to the DPI result. Optionally, the message includes the continue reporting instruction.

The embodiment shown in the packet processing method 500 is also applicable to a DPI request network element in other mobile or fixed network, such as a PDW-GW, an AC, a BRAS, a PDSN, an ASN-GW or the like, and an implementation flow thereof is basically the same as the flow of the present embodiment, which will not be described redundantly herein for concision.

Figure 6:
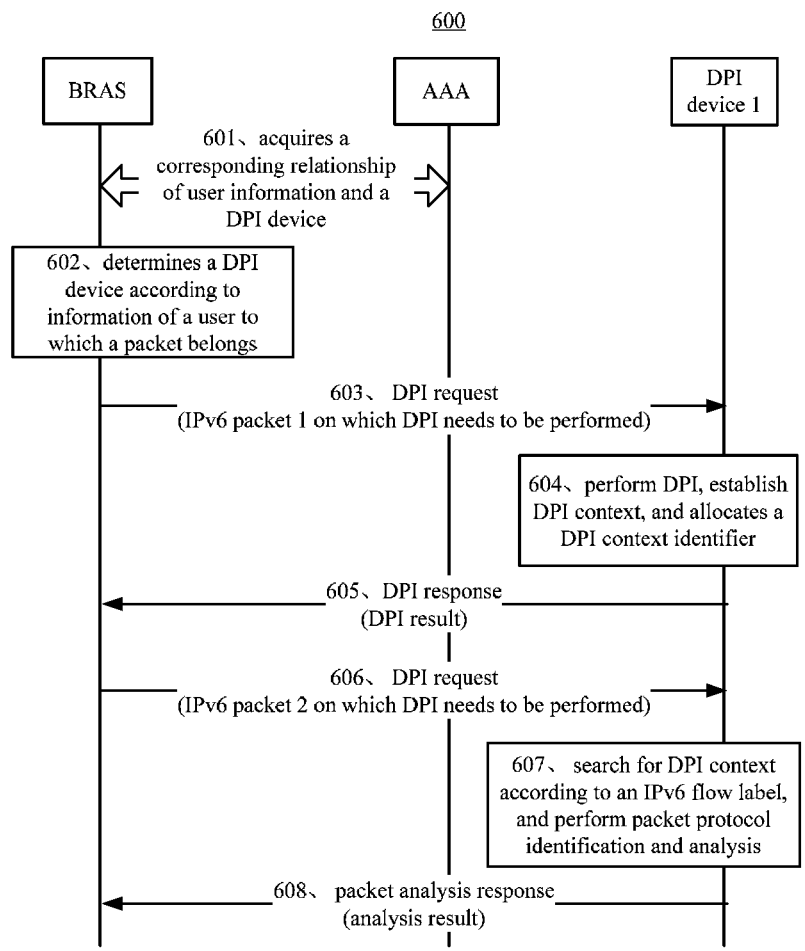
FIG. 6 shows a schematic flowchart of a packet processing method according to another embodiment of the present disclosure.

FIG. 6 is a schematic flowchart of a packet processing method 600 according to an embodiment of the present disclosure. The present embodiment is illustrated by taking it as an example that a BRAS in a fixed network is taken as a DPI request network element. As shown in FIG. 6, the method 600 includes the following steps.

601, the BRAS acquires a correspondence of user information and a DPI device from an Authorization, Authentication and Accounting (Authorization, Authentication and Accounting, referred to as "AAA"). For example, a packet of user 1 corresponds to a device identifier of DPI device 1, and a packet of user 2 corresponds to a device identifier of DPI device 2. Optionally, the acquiring process may be finished by an authentication flow for a user accessing a network, and the user information may include at least one of an IP address, a medium access control (Medium Access Control, referred to as "MAC") address and a Line (line) identity (identity, referred to as "ID").

602, the BRAS determines a DPI device according to a user, where it needs to perform DPI on IPv6 (Internet Protocol Version 6) packet 1 and the IPv6 packet 1 belongs to the user. If the packet 1 is a packet of the user 1, then it is determined that the DPI device 1 performs DPI on the packet 1.

603, the BRAS sends the IPv6 packet 1 to the DPI device 1 through a DPI request.

604, the DPI device 1 performs DPI on the packet 1, and searches for corresponding DPI context according to an IPv6 Flow Label (IPv6 flow label) of the packet. Since it is the first time DPI is performed to a service flow to which the packet 1 belongs, the DPI context does not exist. After the search fails, the DPI device 1 establishes DPI context corresponding to the service flow, and the DPI context is identified by an IPv6 Flow Label.

605, the DPI device 1 sends DPI result back to the BRAS through a response message. Optionally, the DPI result may further include an continue reporting instruction for instructing that it is still needed to continue to report DPI for a subsequent packet of the service flow.

606, when packet 2 of the service flow reaches the BRAS, where DPI needs to be performed on the packet 2, the BRAS sends the packet 2 to the DPI device 1 through a DPI request.

607, the DPI device 1 acquires DPI context corresponding to the service flow according to an IPv6 Flow Label (flow label) of the packet 2 in the request message, and performs DPI based on the DPI context and the packet 2 to acquire DPI result.

608, the DPI device 1 sends the DPI result back to the BRAS through a DPI response message. Optionally, the continue reporting instruction is included, so as to enable the BRAS to perform service control to the packet according to the DPI result.

The embodiment as shown in the packet processing method 600 is also applicable to a DPI request network element in other mobile or fixed network, such as a GGSN, an SGSN, an S-GW, a PDN-GW, an AC, an AP, a PDSN, an ASN-GW or the like, and the implementation flow thereof is basically the same as the flow of the present embodiment, which will not be described redundantly.

Figure 7:
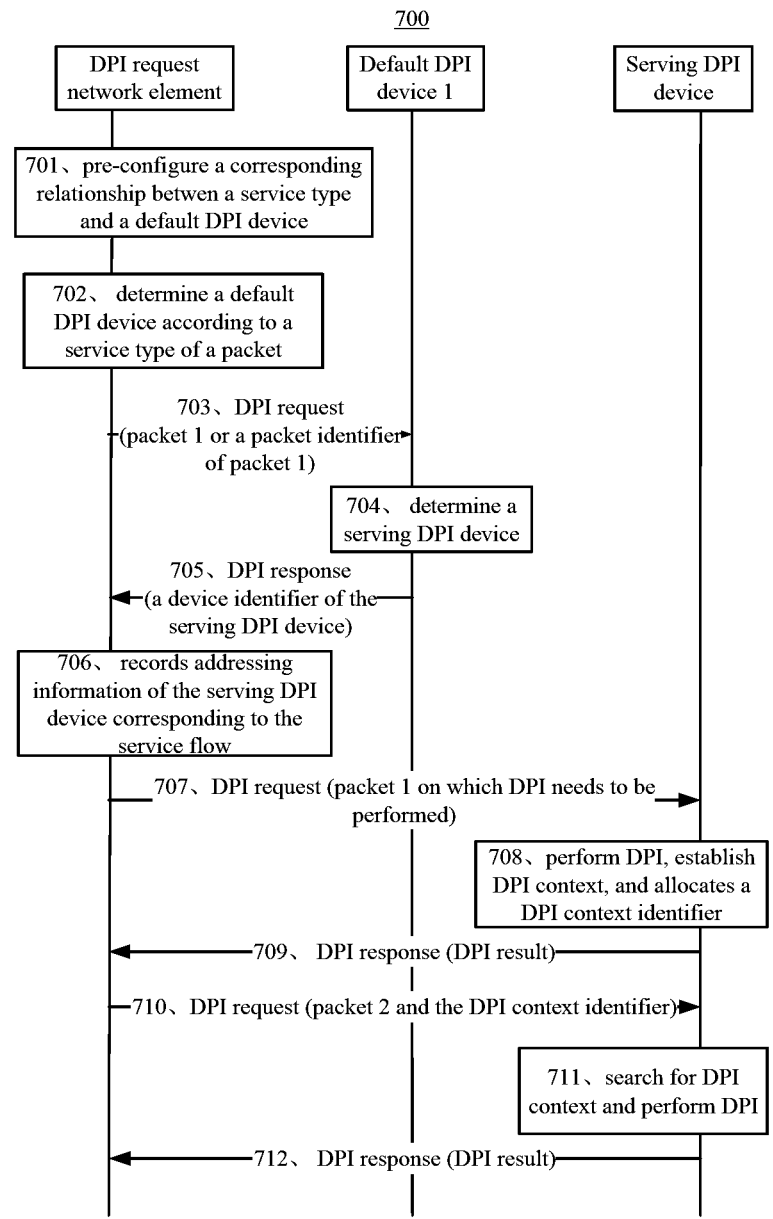
FIG. 7 shows a schematic flowchart of a packet processing method according to another embodiment of the present disclosure.

FIG. 7 is a schematic flowchart of a packet processing method 700 according to an embodiment of the present disclosure. As shown in FIG. 7, the method 700 includes the following steps.

701, a correspondence of a service type and a default DPI device is pre-configured on a DPI request network element. For example, Web service corresponds to an IP address of default DPI device 1, and Video service corresponds to an IP address of default DPI device 2.

702, the DPI request network element determines a default DPI device according to a service type of packet 1 on which DPI is to be performed. If a destination port number of the packet is 80, the service type is determined as the Web service, and then the IP address of the default DPI device 1 is acquired.

703, the DPI request network element sends a DPI request to the default DPI device 1, where the DPI request optionally includes the packet 1 or includes a packet identifier of the packet 1.

704, the default DPI device 1 allocates serving DPI device resource to the service flow.

705, the default DPI device 1 sends a device identifier of a serving DPI device back to the DPI request network element through a DPI message.

706, the DPI request network element records an identifier of a serving DPI device corresponding to the service flow.

707, the DPI request network element sends the packet 1 to the serving DPI device through a DPI request.

708, the serving DPI device performs DPI on the packet 1, establishes DPI context corresponding to the service flow to which the packet 1 belongs, and allocates a DPI context identifier.

709, the serving DPI device sends DPI result and the DPI context identifier back to the DPI request network element through a DPI response message, and optionally, a continue reporting instruction is further included to instruct whether it needs to continue to report DPI for a subsequent packet of the service flow.

710, when packet 2 belonging to a same service flow as the service flow reaches the DPI request network element, according to the continue reporting instruction, the DPI request network element sends the packet 2 and a DPI context identifier of the service flow to the serving DPI device through DPI result.

711, the serving DPI device obtains DPI context corresponding to the service flow according to the DPI context identifier in the request message, and performs DPI based on the DPI context and the packet 2.

712, the serving DPI device sends DPI result back to the DPI request network element through a DPI response message, and optionally, the continue reporting instruction is included.

Figure 8:
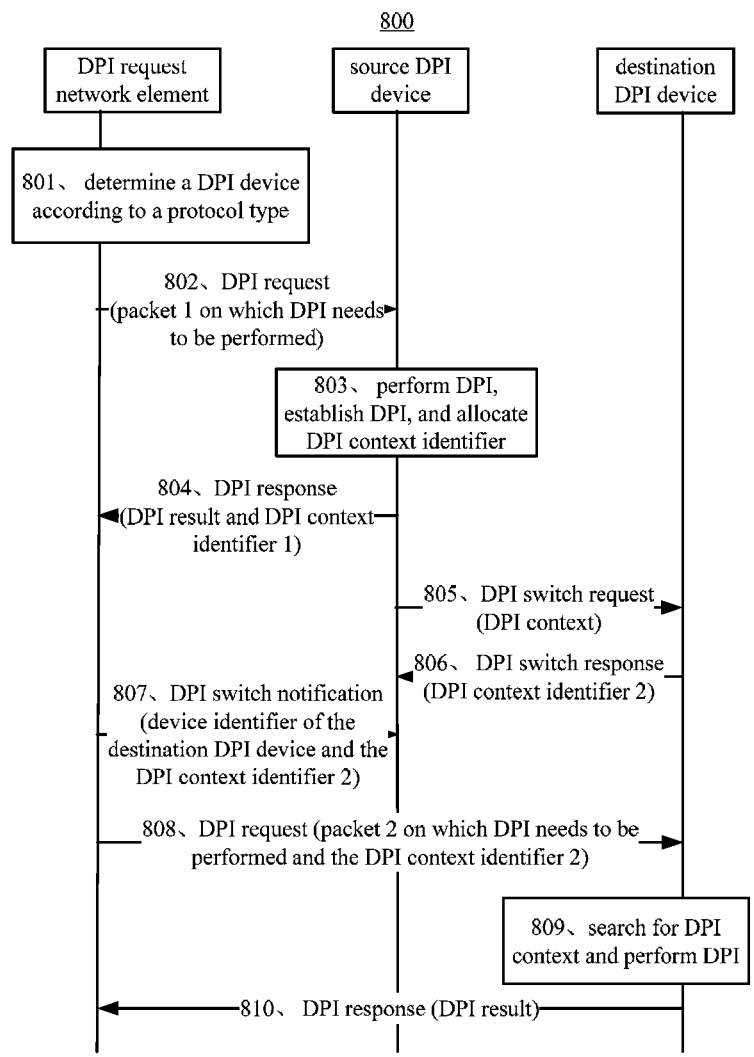
FIG. 8 shows a schematic flowchart of a packet processing method according to another embodiment of the present disclosure.

FIG. 8 is a schematic flowchart of a packet processing method 700 according to an embodiment of the present disclosure. As shown in FIG. 8, the method 800 includes the following steps.

801, a DPI request network element determines an IP address of a source DPI device according to a protocol type of packet 1 on which DPI needs to be performed. A correspondence of the protocol type and a DPI device may be acquired in any manner of the aforementioned embodiment.

802, the DPI request network element sends a DPI request to the source DPI device, where the packet 1 on which DPI needs to be performed is included.

803, the source DPI device performs DPI on the packet 1, establishes DPI context for the service flow, and allocates DPI context identifier 1.

804, the source DPI device sends DPI result and the DPI context identifier 1 back to the DPI request network element through a DPI response message. Processing of a subsequent packet of the service flow on which DPI needs to be performed is same as the aforementioned embodiment, and will not be described redundantly.

805, due to a reason such as load balance, device maintenance or the like, the source DPI device needs to switch DPI function of a subsequent packet of the service flow to which the packet 1 belongs to a destination DPI device. The source DPI device sends a DPI switch request to the destination DPI device, where DPI context of the service flow is included.

806, the destination DPI device stores the DPI context carried in the switch request message and sends a switch request response back. Optionally, the destination DPI device re-allocates DPI context identifier 2 to the DPI context and notifies the source DPI device through a response message.

807, the source DPI device notifies the DPI request network element of a device identifier of the destination DPI device through a DPI switch notification message, and optionally, the DPI context identifier 2 allocated by the destination DPI device is included. In another implementation manner of the present step, the destination DPI device may directly send a switch notification message to the DPI request network element.

808, the DPI request network element stores the destination DPI device and the DPI context identifier 2. When packet 2, on which DPI is to be performed and which belongs to a same service flow as the packet 1, subsequently reaches the DPI request network element, the DPI request network element sends the packet 2 and the DPI context identifier 2 of the service flow to the destination DPI device through a DPI request.

809, the destination DPI device searches for DPI context corresponding to the service flow according to the DPI context identifier 2 in the request message, and performs DPI based on the DPI context and the packet 2 to acquire DPI result.

810, the destination DPI device sends the DPI result back to the DPI request network element through a DPI response message, and optionally, a continue reporting instruction is included.

In the present embodiment, the DPI device allocates the DPI context identifier. If an inherent packet identifier, such as, for example, an IP quintuple or IPV6 Flow Label (IPV6 flow label), a differentiated services code point (Differentiated Services Code Point, referred to as "DSCP") code or the like, is taken as a DPI context identifier, then the steps regarding allocation and sending of a new DPI context identifier in the above-mentioned steps 806, 807 may be omitted.

Figure 9:
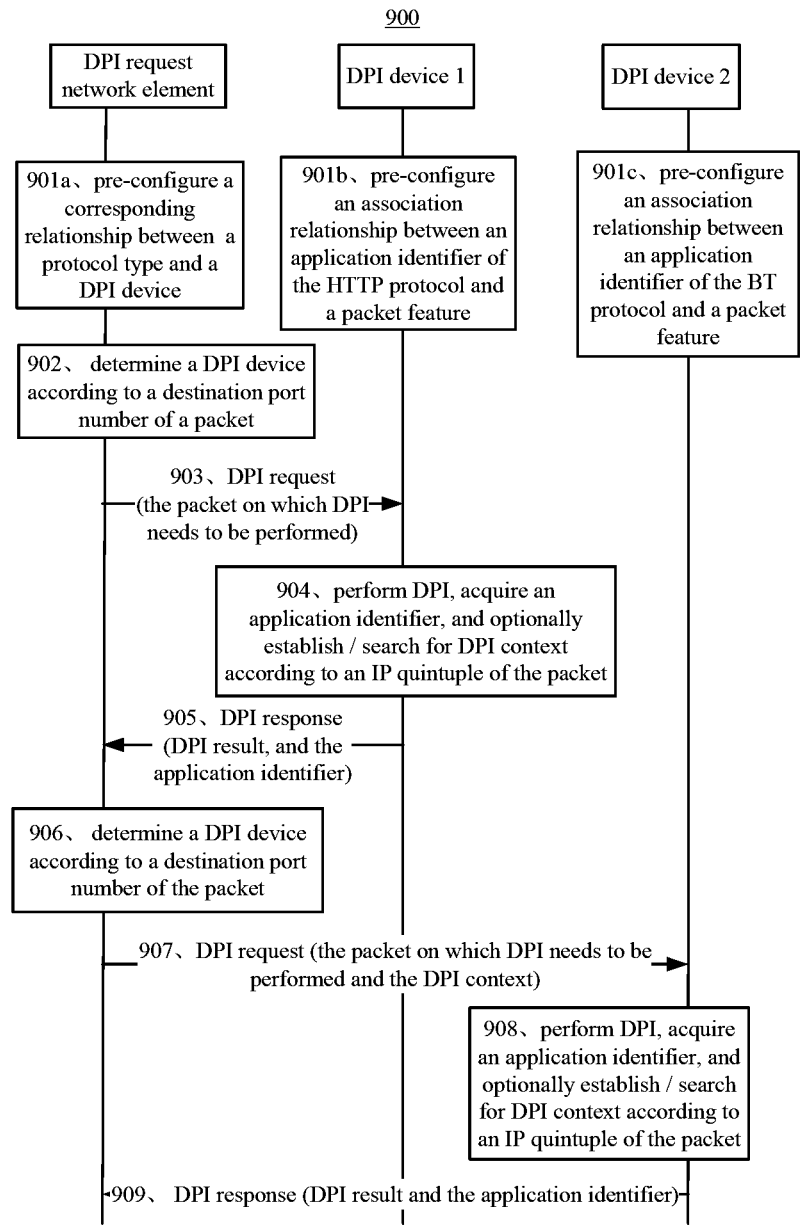
FIG. 9 shows a schematic flowchart of a packet processing method according to another embodiment of the present disclosure.

FIG. 9 is a schematic flowchart of a packet processing method 900 according to an embodiment of the present disclosure. As shown in FIG. 9, the method 900 includes the following steps.

901a, a correspondence addressing information of a DPI device of a protocol type is pre-configured on a DPI request network element. For example, HTTP protocol corresponds to an IP address of DPI device 1, and BT protocol corresponds to an IP address of DPI device 2.

901b, an association relationship between an application identifier of the HTTP protocol and a packet feature is pre-configured on the DPI device 1.

901c, an association relationship between an application identifier of the BT protocol and a packet feature is pre-configured on the DPI device 2.

902, the DPI request network element determines a DPI device according to a destination port number of a packet on which DPI needs to be performed. If the destination port number of the packet is 80, it is determined that the destination port number 80 corresponds to the HTTP protocol, and then it is determined that the DPI device 1 performs DPI on the packet on which DPI needs to be performed.

903, the DPI request network element sends the packet on which DPI needs to be performed to the DPI device 1 through a DPI request.

904, the DPI device 1 performs DPI on the packet, and optionally, further searches for DPI context corresponding to a service flow to which the packet belongs according to an IP quintuple of the packet. If the DPI device 1 successfully acquires the DPI context, the DPI device 1 performs DPI on the packet on which DPI needs to be performed according to the DPI context. The DPI device 1 maps DPI result onto a corresponding application identifier.

905, the DPI device 1 sends the application identifier back to the DPI request network element through a DPI response message, so as to enable the DPI request network element to perform service control to the packet according to the application identifier.

906-909, the DPI request network element determines a DPI device according to a destination port number of the packet on which DPI needs to be performed. If the destination port number of the packet is 6881-6889, it is determined that the protocol type corresponding to the port number 6881-6889 is the BT protocol, and then it is determined that the DPI device 2 performs DPI on the packet on which DPI needs to be performed. Steps 906-909 are similar to steps 902-905, and will not be described redundantly herein for concision.

It should be understood that the present embodiment is also applicable to a condition that the DPI request network element selects a DPI device for performing DPI according to a correspondence between other packet feature and a DPI device, where the other packet feature may be one or multiple of an affiliated APN network, a service type, user information and user group information, and certainly may also be other packet feature, which is not limited in the embodiment of the present disclosure. A specific implementation flow is basically the same as the flow of the present embodiment, and will not be described redundantly for concision.

Figure 10:
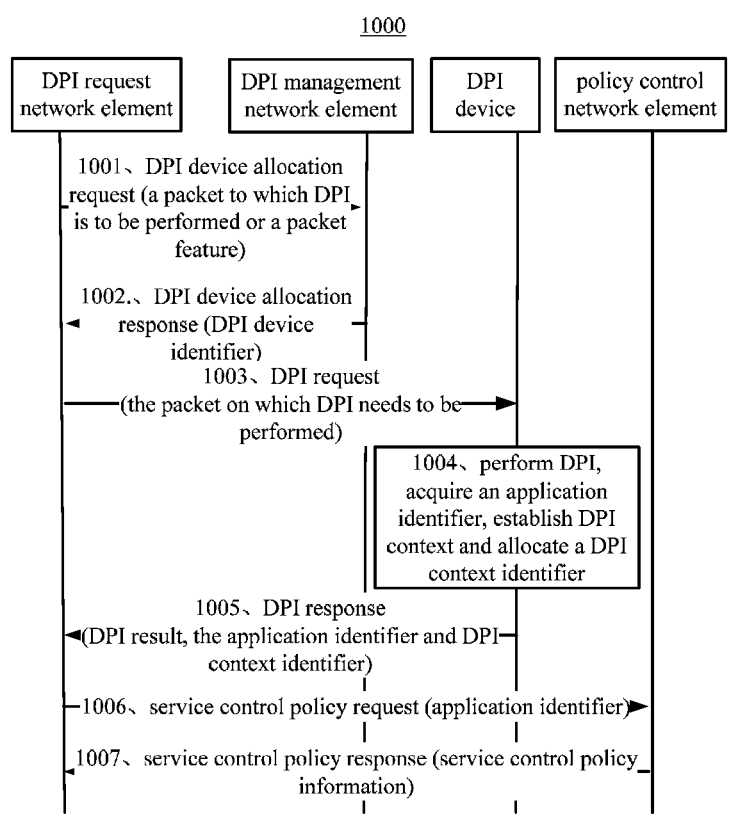
FIG. 10 shows a schematic flowchart of a packet processing method according to another embodiment of the present disclosure.

FIG. 10 is a schematic flowchart of a packet processing method 1000 according to an embodiment of the present disclosure. As shown in FIG. 10, the method 1000 includes the following steps.

1001, a DPI request network element sends a packet on which DPI needs to be performed or a packet feature (e.g., a destination port number, an affiliated user or APN network, an IPv6 Flow Label or the like) of a packet on which DPI needs to be performed to a DPI management network element through a DPI device allocation request message.

1002, the DPI management network element determines a DPI device identifier for providing DPI service to a service flow to which the packet belongs according to information carried in the request message, such as the packet feature of the packet on which DPI needs to be performed or the like, and sends back the DPI device identifier to the DPI request network element through a DPI device allocation response message.

1003, the DPI request network element sends a DPI request of the packet on which DPI needs to be performed to the DPI device allocated in step 1002; and optionally, a DPI context identifier may be included in the request message.

1004, the DPI device performs DPI on the packet on which DPI needs to be performed, and maps DPI result onto a corresponding application identifier. Optionally, if the DPI request message includes the DPI context identifier, the DPI device may also searches for DPI context corresponding to the service flow to which the packet belongs according to the DPI context identifier, and if the DPI context is successfully acquired, the DPI device performs DPI according to the DPI context and the packet on which DPI needs to be performed. Optionally, the DPI device may also establish DPI context and allocate a context identifier.

1005, the DPI device sends DPI result and the application identifier back to the DPI request network element through a DPI response message, and optionally, the DPI context identifier is carried.

1006, the DPI request network element sends the application identifier to a policy control network element through a service control policy request message.

1007, the policy control network element determines service control policy information related to the application identifier. The policy control network element may determine service control policy information by means of its own configuration or by interacting with other network element, which is not limited by the present disclosure. The policy control network element sends back a service control policy response message to the DPI request network element, so as to enable the DPI request network element to perform service control to the packet and to a related service flow.

It should be understood that the present embodiment is also applicable to a condition that the DPI request network element selects a DPI device used for performing DPI according to a correspondence of other packet feature and a DPI device, where the other packet feature may be one or multiple of an affiliated APN network, a service type, user information and user group information, and certainly may also be other packet feature, which is not limited in the embodiment of the present disclosure. A specific implementation flow is basically the same as the flow of the present embodiment, and will not be described redundantly for concision.

In the present embodiment, the flows of two steps, determining the DPI device and acquiring the DPI result, are respectively described in steps 1001-1002 and steps 1003-1005. The above-mentioned two steps may adopt implementation manners of corresponding steps in the foregoing embodiments respectively so as to realize a combination of various flows, and will not be described redundantly in the present disclosure.

Therefore, in the packet processing method of the embodiment of the present disclosure, a DPI device for performing DPI on a packet on which DPI needs to be performed is determined based on packet feature of the packet on which DPI needs to be performed, thereby realizing support for a network environment deployed with multiple DPI devices. Moreover, by means of the DPI context identifier, validity of the DPI context may be maintained when the DPI device is switched, thereby avoiding interruption of DPI service.

The packet processing method according to an embodiment of the present disclosure has been described above in combination with FIG. 1 to FIG. 10. A DPI request network element and a DPI device according to an embodiment of the present disclosure will be described respectively below in combination with FIG. 11 to FIG. 16.

Figure 11:
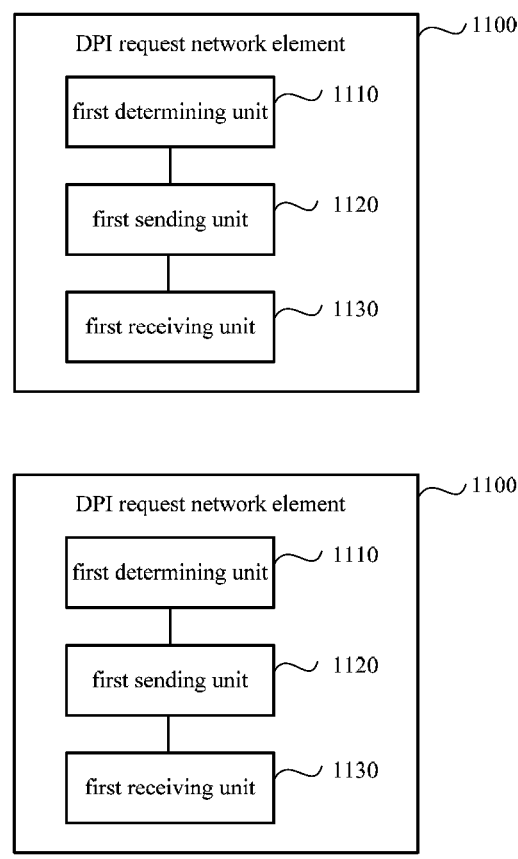
FIG. 11 shows a schematic block diagram of a DPI request network element according to an embodiment of the present disclosure.

FIG. 11 is a schematic block diagram of a DPI request network element 1100 according to an embodiment of the present disclosure. As shown in FIG. 11, the DPI request network element 1100 includes the following units:

a first determining unit 1110, configured to determine, according to a packet feature of a first packet of a service flow, that a first DPI device is used for performing DPI on the first packet, where deep packet inspection (DPI) needs to be performed on the first packet;

a first sending unit 1120, configured to send a first DPI request to the first DPI device, where the first DPI request includes all or part of contents of the first packet; and a first receiving unit 1130, configured to receive a first DPI response that is sent by the first DPI device according to the first DPI request, where the first DPI response includes DPI result.

Therefore, in the DPI request network element of the embodiment of the present disclosure, the DPI device, which is used for performing DPI on the packet on which DPI needs to be performed, is determined based on the packet feature of the packet on which DPI needs to be performed, thus realizing support for a network environment deployed with multiple DPI devices.

Optionally, when it is determined that a DPI context identifier corresponding to the service flow is stored, the first sending unit 1120 is specifically configured to:

send the first DPI request which further includes the DPI context identifier corresponding to the service flow to the first DPI device, so as to enable the first DPI device to determine DPI context corresponding to the service flow according to the DPI context identifier corresponding to the service flow, and to perform DPI on all or part of contents of the first packet according to the DPI context corresponding to the service flow.

Figure 12:
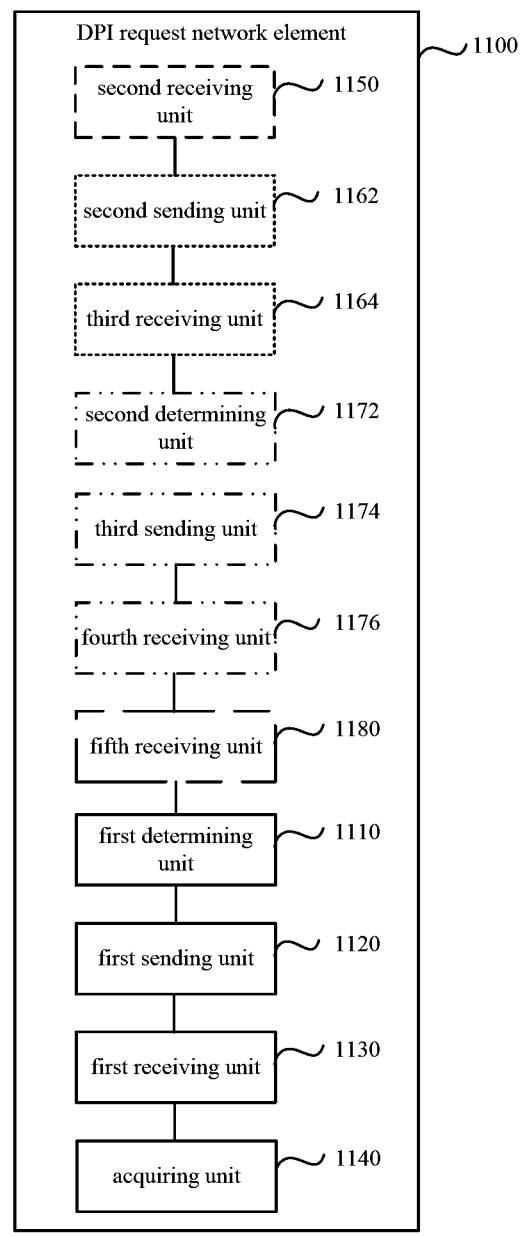
FIG. 12 shows a schematic block diagram of a DPI request network element according to another embodiment of the present disclosure.

Optionally, as shown in FIG. 12, besides the first determining unit 1110, the first sending unit 1120 and the first receiving unit 1130, the DPI request network element 1100 further includes:

an acquiring unit 1140, configured to acquire, when the first DPI response includes a DPI context identifier corresponding to the service flow, the DPI context identifier corresponding to the service flow from the first response, and to carry the DPI context identifier corresponding to the service flow in a DPI request when the DPI request comprising a packet of the service flow is subsequently sent to the first DPI device, where DPI needs to be performed on the packet.

Optionally, the first DPI response further includes instruction information for instructing whether the DPI request network element continues to report a packet of the service flow to the first DPI device, where DPI needs to be performed on the packet, so as to enable the DPI request network element to determine whether it needs to continue to send a DPI request carrying a packet of the service flow to the first DPI device subsequently according to the instruction information.

Optionally, as shown in FIG. 12, the DPI request network element 1100 further includes the following unit:

a second receiving unit 1150, configured to receive a DPI allocation message sent by a second DPI device before it is determined that the first DPI device is used for performing DPI on the first packet, where the DPI allocation message includes a correspondence of a packet feature and a DPI device.

Optionally, as shown in FIG. 12, the DPI request network element 1100 further includes the following units:

a second sending unit 1162, configured to send a DPI allocation request message to a third DPI device before it is determined that the first DPI device is used for performing DPI on the first packet, where the DPI allocation request message carries all or part of contents of the first packet, or carries the packet feature of the first packet; and a third receiving unit 1164, configured to receive a DPI allocation response message sent by the third DPI device, where the DPI allocation response message carriers a device identifier of the first DPI device, and is used for notifying the DPI request network element that the first DPI device performs DPI on a packet on which DPI needs to be performed and which corresponds to the packet feature of the first packet.

Optionally, as shown in FIG. 12, the DPI request network element 1100 further includes the following units:

a second determining unit 1172, configured to determine, before it is determined that the first DPI device is used for performing DPI on the first packet, that a fourth DPI device is used for performing DPI on the first packet according to the packet feature of the first packet;

a third sending unit 1174, configured to a second DPI request to the fourth DPI device, where the second DPI request carries all or part of contents of the first packet; and a fourth receiving unit 1176, configured to receive a DPI redirection message that is sent by the fourth DPI device according to the second DPI request, where the DPI redirection message carries a device identifier of the first DPI device, and is used for notifying the DPI request network element that the first DPI device performs DPI on a packet on which DPI needs to be performed and which corresponds to the packet feature of the first packet.

Optionally, as shown in FIG. 12, the DPI request network element 1100 further includes the following unit:

a fifth receiving unit 1180, configured to receive a DPI switch notification message sent by the first DPI device, where the DPI switch notification message carries a device identifier of a fifth DPI device, and is used for notifying the DPI request network element that the fifth DPI device performs DPI on a packet of the service flow, where DPI needs to be performed on the packet subsequently.

Optionally, the DPI switch notification message further carries an updated DPI context identifier corresponding to the service flow.

Optionally, the packet feature includes at least one of a protocol type, an affiliated APN network, a service type, user information and user group information.

Therefore, according to the DPI request network element of the embodiment of the present disclosure, a DPI device for performing DPI on a packet on which DPI needs to be performed is determined based on packet feature of the packet on which DPI needs to be performed, thereby realizing support for a network environment deployed with multiple DPI devices. Moreover, by means of the DPI context identifier, validity of the DPI context may be maintained when the DPI device is switched, thereby avoiding interruption of DPI service.

Figure 13:
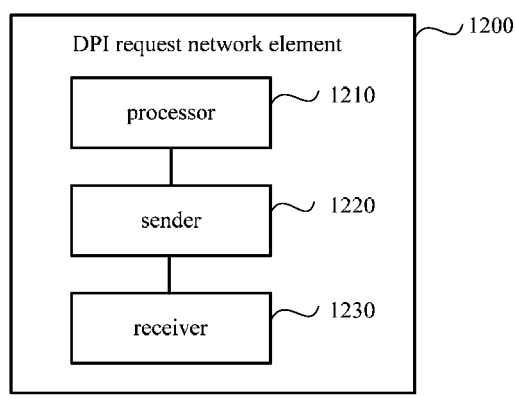
FIG. 13 shows a schematic block diagram of a DPI request network element according to another embodiment of the present disclosure.

A schematic block diagram of a DPI request network element 1200 according to another embodiment of the present disclosure will be described below in combination with FIG. 13. As shown in FIG. 13, the DPI request network element 1200 includes the following units:

a processor 1210, configured to determine, according to a packet feature of a first packet of a service flow, that a first deep packet inspection (DPI) device is used for performing DPI on the first packet, where DPI needs to be performed on the first packet;

a sender 1220, configured to send a first DPI request to the first DPI device, where the first DPI request includes all or part of contents of the first packet; and a receiver 1230, configured to receive a first DPI response that is sent by the first DPI device according to the first DPI request, where the first DPI response includes DPI result.

Therefore, according to the DPI request network element of the embodiment of the present disclosure, the DPI device, which is used for performing DPI on the packet on which DPI needs to be performed, is determined based on the packet feature of the packet on which DPI needs to be performed, thus realizing support for a network environment deployed with multiple DPI devices.

Optionally, when it is determined that a DPI context identifier corresponding to the service flow is stored, the sender 1220 is specifically configured to:

send the first DPI request which further includes the DPI context identifier corresponding to the service flow to the first DPI device, so as to enable the first DPI device to determine DPI context corresponding to the service flow according to the DPI context identifier corresponding to the service flow, and to perform DPI on all or part of contents of the first packet according to the DPI context corresponding to the service flow.

Optionally, the processor 1210 is further configured to acquire, when the first DPI response includes a DPI context identifier corresponding to the service flow, the DPI context identifier corresponding to the service flow from the first response, and to carry the DPI context identifier corresponding to the service flow in a DPI request when the DPI request comprising a packet of the service flow is subsequently sent to the first DPI device, where DPI needs to be performed on the packet.

Optionally, the first DPI response further includes instruction information for instructing whether the DPI request network element continues to report a packet of the service flow to the first DPI device, where DPI needs to be performed on the packet, so as to enable the DPI request network element to determine whether it needs to continue to send a DPI request carrying a packet of the service flow to the first DPI device subsequently according to the instruction information.

Optionally, the receiver 1230 is further configured to receive a DPI allocation message sent by a second DPI device before it is determined that the first DPI device is used for performing DPI on the first packet, where the DPI allocation message includes a correspondence of a packet feature and a DPI device.

Optionally, the sender 1220 is further configured to send a DPI allocation request message to a third DPI device before it is determined that the first DPI device is used for performing DPI on the first packet, where the DPI allocation request message carries all or part of contents of the first packet, or carries the packet feature of the first packet; and the receiver 1230 is further configured to receive a DPI allocation response message sent by the third DPI device, where the DPI allocation response message carriers a device identifier of the first DPI device, and is used for notifying the DPI request network element that the first DPI device performs DPI on a packet on which DPI needs to be performed and which corresponds to the packet feature of the first packet.

Optionally, the processor 1210 is further configured to determine, before it is determined that the first DPI device is used for performing DPI on the first packet, that a fourth DPI device is used for performing DPI on the first packet according to the packet feature of the first packet;

the sender 1220 is further configured to a second DPI request to the fourth DPI device, where the second DPI request carries all or part of contents of the first packet; and the receiver 1230 is further configured to receive a DPI redirection message that is sent by the fourth DPI device according to the second DPI request, where the DPI redirection message carries a device identifier of the first DPI device, and is used for notifying the DPI request network element that the first DPI device performs DPI on a packet on which DPI needs to be performed and which corresponds to the packet feature of the first packet.

Optionally, the receiver 1230 is further configured to receive a DPI switch notification message sent by the first DPI device, where the DPI switch notification message carries a device identifier of a fifth DPI device, and is used for notifying the DPI request network element that the fifth DPI device performs DPI on a packet of the service flow, where DPI needs to be performed on the packet subsequently.

Optionally, the DPI switch notification message further carries an updated DPI context identifier corresponding to the service flow.

Optionally, the packet feature includes at least one of a protocol type, an affiliated APN network, a service type, user information and user group information.

Therefore, according to the DPI request network element of the embodiment of the present disclosure, a DPI device for performing DPI on a packet on which DPI needs to be performed is determined based on packet feature of the packet on which DPI needs to be performed, thereby realizing support for a network environment deployed with multiple DPI devices. Moreover, by means of the DPI context identifier, validity of the DPI context may be maintained when the DPI device is switched, thereby avoiding interruption of DPI service.

A schematic block diagram of a DPI device according to an embodiment of the present disclosure will be described below in combination with FIG. 14 to FIG. 16.

Figure 14:
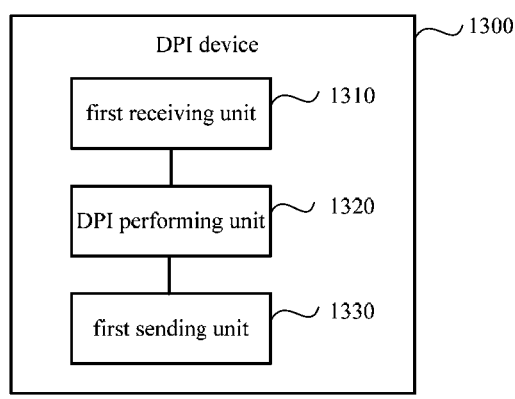
FIG. 14 shows a schematic block diagram of a DPI device according to an embodiment of the present disclosure.

FIG. 14 is a schematic block diagram of a DPI device 1300 according to an embodiment of the present disclosure. As shown in FIG. 14, the DPI device 1300 includes the following units:

a first receiving unit 1310, configured to receive a first deep packet inspection (DPI) request, which is sent by a DPI device according to packet feature of a first packet of a service flow, where DPI needs to be performed on the first packet, and the first DPI request includes all or part of contents of the first packet;

a DPI performing unit 1320, configured to perform DPI on all or part of contents of the first packet according to the first DPI request to acquire DPI result; and a first sending unit 1330, configured to send a first DPI response to the DPI request network element, where the first DPI response includes the DPI result.

Therefore, according to the DPI device of the embodiment of the present disclosure, a DPI device, which is used for performing DPI on the packet on which DPI needs to be performed, is determined based on the packet feature of the packet on which DPI needs to be performed, thus realizing support for a network environment deployed with multiple DPI devices.

Optionally, the DPI performing unit 1320 is specifically configured to:

determine, according to the first DPI request, whether DPI context corresponding to the service flow has been established;

when it is determined that the DPI context corresponding to the service flow has been established, perform DPI on all or part of contents of the first packet according to the DPI context corresponding to the service flow; and when it is determined that the DPI context corresponding to the service flow has not been established, perform DPI on all or part of contents of the first packet and establishing the DPI context corresponding to the service flow.

Optionally, the first DPI request includes a DPI context identifier corresponding to the service flow; and when it is determined that the DPI context corresponding to the service flow has been established, the DPI performing unit 1320 is specifically configured to:

acquire the DPI context corresponding to the service flow according to the DPI context identifier corresponding to the service flow comprised in the first DPI request; and perform DPI on all or part of contents of the first packet according to the DPI context corresponding to the service flow.

Optionally, when it is determined that the DPI context corresponding to the service flow has not been established, the DPI performing unit 1320 is specifically configured to:

perform DPI on all or part of contents of the first packet, establishing DPI context corresponding to the service flow, and generating a DPI context identifier corresponding to the service flow; and the first sending unit 1330 is specifically configured to:

send the first DPI response comprising the DPI context identifier corresponding to the service flow to the DPI request network element.

Optionally, the DPI performing unit 1320 is specifically configured to:

determine whether the DPI request network element needs to continue to report a subsequent packet of the service flow; and where the first DPI response further includes instruction information for instructing whether the DPI request network element continues to report the subsequent packet of the service flow to the first DPI device, so as to enable the DPI request network element to determine whether it needs to continue to send a DPI request carrying a packet of the service flow to the first DPI device subsequently according to the instruction information.

Figure 15:
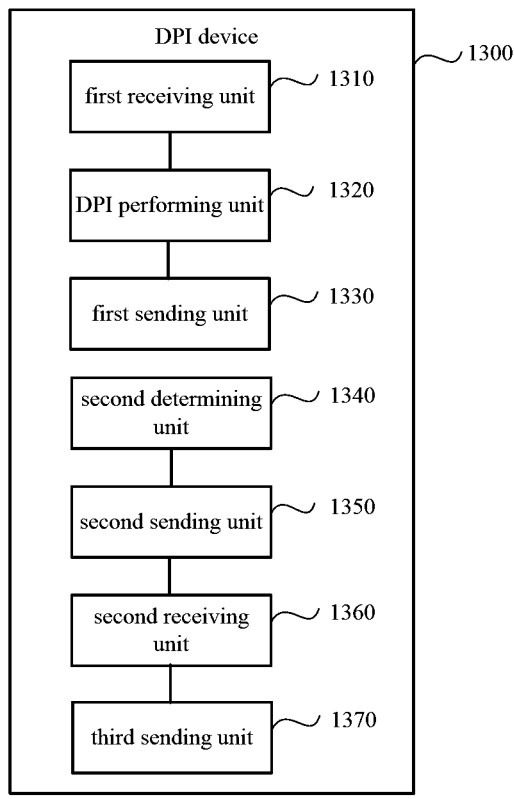
FIG. 15 shows a schematic block diagram of a DPI device according to another embodiment of the present disclosure.

Optionally, as shown in FIG. 15, besides the first receiving unit 1310, the DPI performing unit 1320 and the first sending unit 1330, the DPI device 1300 further includes the following steps:

a second determining unit 1340, configured to determine to switch DPI function for a packet of the service flow to a fifth DPI device, where DPI needs to be performed on the packet subsequently;

a second sending unit 1350, configured to send a DPI switch request message to the fifth DPI device, where the DPI switch request message carries DPI context corresponding to the service flow;

a second receiving unit 1360, configured to receive a DPI switch request response sent by the fifth DPI device according to the DPI switch request message; and a third sending unit 1370, configured to send a DPI switch notification message to the DPI request network element, where the DPI switch notification message carriers a device identifier of the fifth DPI device, and is used for notifying the DPI request network element that the fifth DPI device is used for performing DPI on a packet of the service flow on which DPI is to be performed.

Optionally, the DPI switch notification message and the DPI switch notification message carry an updated DPI context identifier corresponding to the service flow.

Therefore, according to the DPI device of the embodiment of the present disclosure, a DPI device for performing DPI on a packet on which DPI needs to be performed is determined based on packet feature of the packet on which DPI needs to be performed, thereby realizing support for a network environment deployed with multiple DPI devices. Moreover, by means of the DPI context identifier, validity of the DPI context may be maintained when the DPI device is switched, thereby avoiding interruption of DPI service.

Figure 16:
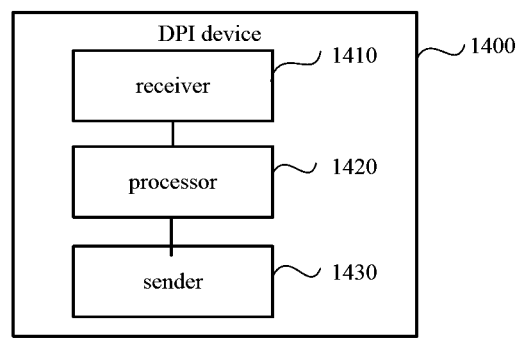
FIG. 16 shows a schematic block diagram of a DPI device according to another embodiment of the present disclosure.

FIG. 16 is a schematic block diagram of a DPI device 1400 according to an embodiment of the present disclosure. As shown in FIG. 16, the DPI device 1400 includes the following steps:

a receiver 1410, configured to receive a first deep packet inspection (DPI) request, which is sent by a DPI device according to packet feature of a first packet of a service flow, where DPI needs to be performed on the first packet, and the first DPI request includes all or part of contents of the first packet;

a processor 1420, configured to perform DPI on all or part of contents of the first packet according to the first DPI request to acquire DPI result; and a sender 1430, configured to send a first DPI response to the DPI request network element, where the first DPI response includes the DPI result.

Therefore, according to the DPI device of the embodiment of the present disclosure, a DPI device, which is used for performing DPI on the packet on which DPI needs to be performed, is determined based on the packet feature of the packet on which DPI needs to be performed, thus realizing support for a network environment deployed with multiple DPI devices.

Optionally, the processor 1420 is specifically configured to:

determine, according to the first DPI request, whether DPI context corresponding to the service flow has been established;

when it is determined that the DPI context corresponding to the service flow has been established, perform DPI on all or part of contents of the first packet according to the DPI context corresponding to the service flow; and when it is determined that the DPI context corresponding to the service flow has not been established, perform DPI on all or part of contents of the first packet and establishing the DPI context corresponding to the service flow.

Optionally, the first DPI request includes a DPI context identifier corresponding to the service flow; and when it is determined that the DPI context corresponding to the service flow has been established, the processor 1420 is specifically configured to:

acquire the DPI context corresponding to the service flow according to the DPI context identifier corresponding to the service flow comprised in the first DPI request; and perform DPI on all or part of contents of the first packet according to the DPI context corresponding to the service flow.

Optionally, when it is determined that the DPI context corresponding to the service flow has not been established, the processor 1420 is specifically configured to:

perform DPI on all or part of contents of the first packet, establishing DPI context corresponding to the service flow, and generating a DPI context identifier corresponding to the service flow; and the sender 1430 is specifically configured to:

send the first DPI response comprising the DPI context identifier corresponding to the service flow to the DPI request network element.

Optionally, the processor 1420 is specifically configured to:

determine whether the DPI request network element needs to continue to report a subsequent packet of the service flow; and where the first DPI response further includes instruction information for instructing whether the DPI request network element continues to report the subsequent packet of the service flow to the first DPI device, so as to enable the DPI request network element to determine whether it needs to continue to send a DPI request carrying a packet of the service flow to the first DPI device subsequently according to the instruction information.

The processor 1420 is further configured to determine to switch DPI function for a packet of the service flow to a fifth DPI device, where DPI needs to be performed on the packet subsequently;

the sender 1430 is further configured to send a DPI switch request message to the fifth DPI device, where the DPI switch request message carries DPI context corresponding to the service flow;

the receiver 1410 is further configured to receive a DPI switch request response sent by the fifth DPI device according to the DPI switch request message; and the sender 1430 is further configured to send a DPI switch notification message to the DPI request network element, where the DPI switch notification message carriers a device identifier of the fifth DPI device, and is used for notifying the DPI request network element that the fifth DPI device is used for performing DPI on a packet of the service flow, where DPI needs to be performed on the packet.

Optionally, the DPI switch notification message and the DPI switch notification message carry an updated DPI context identifier corresponding to the service flow.

Therefore, according to the DPI device of the embodiment of the present disclosure, a DPI device for performing DPI on a packet on which DPI needs to be performed is determined based on packet feature of the packet on which DPI needs to be performed, thereby realizing support for a network environment deployed with multiple DPI devices. Moreover, by means of the DPI context identifier, validity of the DPI context may be maintained when the DPI device is switched, thereby avoiding interruption of DPI service.

Those of ordinary skill in the art may be aware that, units and algorithm steps of the respective examples described in the embodiments disclosed in the present disclosure may be implemented by an electronic hardware or by a combination of a computer software and an electronic hardware. Whether these functions are implemented in form of hardware or software depends on specific application and design constraint condition of the technical solutions. Those skilled may implement the described functions by using different methods for each specific application, but this implementation should not be considered as beyond the scope of the present disclosure.

Those skilled in the art may clearly understand that, for convenience and concision of description, specific working processes of the system, apparatus and units described above may refer to corresponding processes in the foregoing method embodiments, and will not be described redundantly herein.

In several embodiments provided by the present application, it should be understood that the disclosed system, apparatus and method may be implemented in other manners. For example, the apparatus embodiments described above are merely exemplary, e.g., division of the units is just a logical function division, and there may exist other division manner in practical implementation. For example, a plurality of units or components may be combined or integrated in another system, or some features may be omitted or not executed. From another point of view, the displayed or discussed mutual coupling, direct coupling or communication connection may be indirect coupling or communication connection of devices or units through some interfaces, and may be in electrical, mechanical or other forms.

The units described as separate components may be separated physically or not. A component displayed as a unit may be physical units or not, namely, may be located in one place, or may be distributed on a plurality of network units. A part of or all of the units may be selected to achieve the purposes of the solutions in the present embodiment according to actual demands.

In addition, the respective functional units in the embodiments of the present disclosure may be integrated in a processing unit, or the respective units individually exist physically, or two or more units are integrated in one unit.

If the function is implemented in form of a software functional unit and is sold or used as an independent product, it may be stored in a computer readable storage medium. Based on such understanding, the technical solutions of the present disclosure substantially, or the part contributing to the prior art, or a part of the technical solutions may be implemented in the form of a software product. The computer software product is stored in a storage medium, and includes a plurality of instructions enabling a computer device (may be a personal computer, a server, or network device, etc.) to execute all or a part of the steps of the methods mentioned in the respective embodiments of the present disclosure. The foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

The aforementioned descriptions are merely specific implementations of the present disclosure, rather than limiting the protection scope of the present disclosure. Any change or substitution that is readily conceived for any one skilled in the art within the technical scope disclosed by the invention shall fall into the protection scope of the invention. Therefore, the protection scope of the present disclosure shall be defined by the claims.

What is claimed is:

1. A packet processing method, comprising:
determining, by a network element, according to a packet feature of a first packet of a service flow, that a first deep packet inspection (DPI) device is used for performing DPI on the first packet, wherein DPI needs to be performed on the first packet;
sending, by the network element, a first DPI request to the first DPI device, wherein the first DPI request comprises at least part of contents of the first packet; and
receiving, by the network element, a first DPI response that is sent by the first DPI device according to the first DPI request, wherein the first DPI response comprises a DPI result.

2. The method of claim 1, further comprising:
when the first DPI response comprises a DPI context identifier corresponding to the service flow, acquiring the DPI context identifier corresponding to the service flow from the first response, and carrying the DPI context identifier corresponding to the service flow in a DPI request when the DPI request comprising a packet of the service flow is subsequently sent to the first DPI device, wherein DPI needs to be performed on the packet, so as to enable the first DPI device to determine DPI context corresponding to the service flow according to the DPI context identifier corresponding to the service flow, and to perform DPI on at least part of the contents of the first packet according to the DPI context corresponding to the service flow.

3. The method of claim 1, wherein the first DPI response further comprises instruction information for instructing whether the DPI request network element continues to report a packet of the service flow to the first DPI device, wherein DPI needs to be performed on the packet, so as to enable the DPI request network element to determine whether it needs to continue to send a DPI request carrying a packet of the service flow to the first DPI device subsequently according to the instruction information.

4. The method of claim 1, wherein before the determining that a first DPI device is used for performing DPI on the first packet, the method further comprises:
receiving a DPI allocation message sent by a second DPI device, wherein the DPI allocation message comprises a correspondence of a packet feature and a DPI device.

5. The method of claim 1, wherein before the determining that a first DPI device is used for performing DPI on the first packet, the method further comprises:
sending a DPI allocation request message to a third DPI device, wherein the DPI allocation request message carries one of at least part of the contents of the first packet and the packet feature of the first packet;
receiving a DPI allocation response message sent by the third DPI device, wherein the DPI allocation response message carriers a device identifier of the first DPI device, and is used for notifying the DPI request network element that the first DPI device performs DPI on a packet on which DPI needs to be performed and which corresponds to the packet feature of the first packet.

6. The method of claim 1, wherein before the determining that a first DPI device is used for performing DPI on the first packet, the method further comprises:
determining, according to the packet feature of the first packet, that a fourth DPI device is used for performing DPI on the first packet;
sending a second DPI request to the fourth DPI device, wherein the second DPI request carries at least part of the contents of the first packet;
receiving a DPI redirection message that is sent by the fourth DPI device according to the second DPI request, wherein the DPI redirection message carries a device identifier of the first DPI device, and is used for notifying the DPI request network element that the first DPI device performs DPI on a packet on which DPI needs to be performed and which corresponds to the packet feature of the first packet.

7. The method of claim 1, further comprising:
receiving a DPI switch notification message sent by the first DPI device, wherein the DPI switch notification message carries a device identifier of a fifth DPI device, and is used for notifying the DPI request network element that the fifth DPI device performs DPI on a packet of the service flow, wherein DPI needs to be performed on the packet subsequently.

8. A packet processing method, comprising:
receiving, by a deep packet inspection (DPI) device, a first DPI request, which is sent by a DPI request network element according to packet feature of a first packet of a service flow, wherein DPI needs to be performed on the first packet, and the first DPI request comprises at least part of contents of the first packet;
performing, by the DPI device, DPI on at least part of the contents of the first packet according to the first DPI request to acquire a DPI result; and sending, by the DPI device, a first DPI response to the DPI request network element, wherein the first DPI response comprises the DPI result.

9. The method of claim 8, wherein the first DPI request comprises a DPI context identifier corresponding to the service flow;
wherein when it is determined that the DPI context corresponding to the service flow has been established, performing DPI on at least part of the contents of the first packet according to the DPI context corresponding to the service flow, comprises:
acquiring the DPI context corresponding to the service flow according to the DPI context identifier corresponding to the service flow comprised in the first DPI request; and
performing DPI on at least part of the contents of the first packet according to the DPI context corresponding to the service flow.

10. The method of claim 8, further comprising:
determining to switch a DPI function for a packet of the service flow to a fifth DPI device, wherein DPI needs to be performed on the packet subsequently;
sending a DPI switch request message to the fifth DPI device, wherein the DPI switch request message carries a DPI context corresponding to the service flow;
receiving a DPI switch request response sent by the fifth DPI device according to the DPI switch request message; and
sending a DPI switch notification message to the DPI request network element, wherein the DPI switch notification message carriers a device identifier of the fifth DPI device, and is used for notifying the DPI request network element that the fifth DPI device is used for performing DPI on a packet of the service flow, wherein DPI needs to be performed on the packet.

11. A deep packet inspection (DPI) request network element, comprising:
a processor, configured to determine, according to a packet feature of a first packet of a service flow, that a first DPI device is used for performing DPI on the first packet, wherein DPI needs to be performed on the first packet;
a sender, configured to send a first DPI request to the first DPI device, wherein the first DPI request comprises at least part of contents of the first packet; and
a receiver, configured to receive a first DPI response that is sent by the first DPI device according to the first DPI request, wherein the first DPI response comprises a DPI result.

12. The DPI request network element of claim 11, wherein the processor is further configured to acquire, when the first DPI response comprises a DPI context identifier corresponding to the service flow, the DPI context identifier corresponding to the service flow from the first response, and to carry the DPI context identifier corresponding to the service flow in a DPI request when the DPI request comprising a packet of the service flow is subsequently sent to the first DPI device, wherein DPI needs to be performed on the packet, so as to enable the first DPI device to determine a DPI context corresponding to the service flow according to the DPI context identifier corresponding to the service flow, and to perform DPI on at least part of the contents of the first packet according to the DPI context corresponding to the service flow.

13. The DPI request network element of claim 11, wherein the first DPI response further comprises instruction information for instructing whether the DPI request network element continues to report a packet of the service flow to the first DPI device, wherein DPI needs to be performed on the packet, so as to enable the DPI request network element to determine whether it needs to continue to send a DPI request carrying a packet of the service flow to the first DPI device subsequently according to the instruction information.

14. The DPI request network element of claim 11, wherein the receiver is further configured to receive a DPI allocation message sent by a second DPI device before it is determined that the first DPI device is used for performing DPI on the first packet, wherein the DPI allocation message comprises a correspondence of a packet feature and a DPI device.

15. The DPI request network element of claim 11, wherein the sender is further configured to send a DPI allocation request message to a third DPI device before it is determined that the first DPI device is used for performing DPI on the first packet, wherein the DPI allocation request message carries one of at least part of the contents of the first packet and the packet feature of the first packet; and
the receiver is further configured to receive a DPI allocation response message sent by the third DPI device, wherein the DPI allocation response message carriers a device identifier of the first DPI device, and is used for notifying the DPI request network element that the first DPI device performs DPI on a packet on which DPI needs to be performed and which corresponds to the packet feature of the first packet.

16. The DPI request network element of claim 11, wherein the processor is further configured to determine, before it is determined that the first DPI device is used for performing DPI on the first packet, that a fourth DPI device is used for performing DPI on the first packet according to the packet feature of the first packet;
the sender is further configured to a second DPI request to the fourth DPI device, wherein the second DPI request carries at least part of the contents of the first packet; and
the receiver is further configured to receive a DPI redirection message that is sent by the fourth DPI device according to the second DPI request, wherein the DPI redirection message carries a device identifier of the first DPI device, and is used for notifying the DPI request network element that the first DPI device performs DPI on a packet on which DPI needs to be performed and which corresponds to the packet feature of the first packet.

17. The DPI request network element of claim 11, wherein the receiver is further configured to receive a DPI switch notification message sent by the first DPI device, wherein the DPI switch notification message carries a device identifier of a fifth DPI device, and is used for notifying the DPI request network element that the fifth DPI device performs DPI on a packet of the service flow, wherein DPI needs to be performed on the packet subsequently.

18. A deep packet inspection (DPI) device, comprising:
a receiver, configured to receive a first DPI request, which is sent by a DPI request network element according to packet feature of a first packet of a service flow, wherein DPI needs to be performed on the first packet, and the first DPI request comprises at least part of contents of the first packet;
a processor, configured to perform DPI on at least part of the contents of the first packet according to the first DPI request to acquire a DPI result; and a sender, configured to send a first DPI response to the DPI request network element, wherein the first DPI response comprises the DPI result.

19. The DPI device of claim 18, wherein the first DPI request comprises a DPI context identifier corresponding to the service flow; and wherein when it is determined that the DPI context corresponding to the service flow has been established, the processor is configured to:

acquire the DPI context corresponding to the service flow according to the DPI context identifier corresponding to the service flow comprised in the first DPI request; and perform DPI on at least part of contents of the first packet according to the DPI context corresponding to the service flow.

20. The DPI device of claim 18, wherein the processor is further configured to determine to switch a DPI function for a packet of the service flow to a fifth DPI device, wherein DPI needs to be performed on the packet subsequently;

the sender is further configured to send a DPI switch request message to the fifth DPI device, wherein the DPI switch request message carries a DPI context corresponding to the service flow;

the receiver is further configured to receive a DPI switch request response sent by the fifth DPI device according to the DPI switch request message; and the sender is further configured to send a DPI switch notification message to the DPI request network element, wherein the DPI switch notification message carriers a device identifier of the fifth DPI device, and is used for notifying the DPI request network element that the fifth DPI device is used for performing DPI on a packet of the service flow, wherein DPI needs to be performed on the packet.

* * * * *